United States Patent
Ohshima et al.

(10) Patent No.: US 8,142,849 B2
(45) Date of Patent: Mar. 27, 2012

(54) RECORDING MEDIA, RECORDING MEDIA-INK SET, INKJET RECORDING METHOD AND INKJET RECORDING APPARATUS

(75) Inventors: Tohru Ohshima, Atsugi (JP); Naoya Morohoshi, Numazu (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 962 days.

(21) Appl. No.: 12/091,758

(22) PCT Filed: Oct. 26, 2006

(86) PCT No.: PCT/JP2006/321929
§ 371 (c)(1),
(2), (4) Date: Apr. 28, 2008

(87) PCT Pub. No.: WO2007/049806
PCT Pub. Date: May 3, 2007

(65) Prior Publication Data
US 2009/0291213 A1    Nov. 26, 2009

(30) Foreign Application Priority Data
Oct. 26, 2005 (JP) .................. 2005-311255
Feb. 21, 2006 (JP) .................. 2006-043240

(51) Int. Cl.
*B05D 1/02* (2006.01)
(52) U.S. Cl. .................. 427/256; 427/355; 427/421.1
(58) Field of Classification Search .................. None
See application file for complete search history.

(56) References Cited

U.S. PATENT DOCUMENTS

| | | |
|---|---|---|
| 2003/0083396 A1 | 5/2003 | Ylitalo et al. |
| 2004/0266907 A1 | 12/2004 | Sugita et al. |
| 2005/0143491 A1 | 6/2005 | Aoshima |
| 2006/0115598 A1 * | 6/2006 | Kaneko et al. .......... 427/307 |

FOREIGN PATENT DOCUMENTS

| | | |
|---|---|---|
| EP | 1 127 709 A1 | 8/2001 |
| EP | 1262529 | 12/2002 |
| EP | 1 683 646 A1 | 7/2006 |
| JP | 11 78225 | 3/1999 |
| JP | 11-119606 | 4/1999 |
| JP | 11 129606 | 5/1999 |
| JP | 2000 280602 | 10/2000 |
| JP | 2003 25717 | 1/2003 |

(Continued)

*Primary Examiner* — Erma Cameron
(74) *Attorney, Agent, or Firm* — Oblon, Spivak, McClelland, Maier & Neustadt, L.L.P.

(57) ABSTRACT

To provide an inkjet recording method including: flying ink by application of stimulation to the ink to form an image on a recording media, wherein the recording media has at least one barrier layer of 10 m or less in thickness on at least one surface of a substrate comprising a cellulose pulp, the barrier layer contains 30% by mass or more of an inorganic pigment with a refraction index of 1.5 or less other than alumina, and the content of pigment with a refraction index of less than 1.5 in the barrier layer is 10% by mass or less, wherein the ink contains either a pigment or colored fine particle as coloring material, and a coloring material fixing constituent, and the surface tension of the ink is 25 mN/m or less, and the total amount of the ink on the recording media is 15 g/m2 or less.

18 Claims, 10 Drawing Sheets

FOREIGN PATENT DOCUMENTS

| | | |
|---|---|---|
| JP | 2003 48374 | 2/2003 |
| JP | 2003-96345 | 4/2003 |
| JP | 2003 176433 | 6/2003 |
| JP | 2003-335987 | 11/2003 |
| JP | 2004-10626 | 1/2004 |
| JP | 2004 43518 | 2/2004 |
| JP | 2004 299302 | 10/2004 |
| JP | 2005 161723 | 6/2005 |
| JP | 2005-187774 | 7/2005 |
| JP | 2005 212327 | 8/2005 |
| JP | 2005-256237 | 9/2005 |

\* cited by examiner

RECORDING MEDIA, RECORDING MEDIA-INK SET, INKJET RECORDING METHOD AND INKJET RECORDING APPARATUS

TECHNICAL FIELD

The present invention relates to a recording media, a recording media-ink set, an inkjet recording method and an inkjet recording apparatus, wherein recording of high-definition images close to recording for commercial printing such as offset printing can be achieved by inkjet printing.

BACKGROUND ART

Inkjet recording is known as an excellent recording method in which recording media are not relatively limited, and recording apparatuses, recording methods and recording materials for the inkjet recording have been actively researched and developed. Until now, as inks for the inkjet recording, those using water-based dyes containing water as a major component have been primarily used. These inks are also currently used mainly in the inkjet recording for their various advantages, e.g., (1) easy availability of color materials with a high extinction coefficient and high color purity, (2) inks can be readily available in a wide range of colors for an expanded coloring range, and (3) it is possible to make ink which has a long term storage stability and a stability for heat and particularly in which cogation hardly occurs.

Inkjet recording media, particularly glossy media for inkjet recording, can be categorized into swelling type-recording media and void type-recording media, and recently void type-recording media which are excellent in ink-drying speed have been dominantly used. Void type-ink recording media are in a mainstay in which an ink absorbing layer having voids for receiving ink is provided on a base, and a porous glossy layer is further provided as needed. These ink recording media are obtained by applying on a base a coating solution in which silica or alumina hydrate has been dispersed to form one or more layers thereon and where necessary, further applying a glossy layer abundantly containing colloidal silica on the layer, as disclosed in Patent documents 1 and 2. Sheets of this type are designed in view of their compatibility with dye inks that are mainly used at present, and have been already used widely as papers specific for inkjet recording, particularly as glossy papers. By use of these sheets, an extremely high definition output with high gloss is obtained, but raw materials are extremely expensive and a production process is complicated. Thus, a production cost is very high compared with glossy coating papers for the popular commercial printing. Therefore, it is an actual circumstance that their usage tends to be limited to photograph printing or the like which requires high quality output, and that it is hard to use them in commercial printing fields such as printings for hardbills, catalogues and pamphlets, in which the inexpensive and massive outputs are required. Recently, for better image quality, there is a tendency that the number of ink colors used for printing been increases and required ink absorbability increases. In order to increase ink absorbability in of recording media, the thickness of an ink receiving layer (coating layer) could be increased, but the thicker the layer is made, the more expensive the material is used, leading to an increase of a unit price of the recording media.

As a pigment which constitutes the above ink receiving layer, it is necessary to use the material which has a small refraction index and a low opacifying property, i.e., in which it is possible to keep a transparency of the ink receiving layer high and an oil absorption (specific surface area) is large. Thus, in the actual circumstance, not inexpensive white pigments such as calcium carbonate and kaolin, but expensive pigments such as silica and alumina hydrate having the low refraction index and high oil absorption must be used in a large amount. This is because when a pigment having a low transparency and high opacifying property is used for the ink receiving layer, the color material in the ink infiltrated in the ink receiving layer is opacified with the pigment with high opacifying property, and thus density is not expressed. In fact, when inkjet printing is performed using the dye ink on the sheet using such a pigment with high opacifying property, even if the amount of the jetted ink is increased, the density only for the color material present in the vicinity of the surface layer is expressed. Thus, the density is totally low, and an image with no contrast is made. When the material having a low oil absorption is used, absorption of the ink is not enough and beading easily occurs.

For these reasons, recently, it has been attempted to balance the refraction index and a degree of whiteness by using organic fine particles having a small refraction index as disclosed in Patent document 3, but the organic fine particle is also expensive, and thus, it is still difficult to obtain inexpensive receiving papers matched with the dye ink.

With respect to the design concept for the long term storage stability of the formed image, a line of thought is a mainstream in which due to low resistance of dye molecules themselves to ultraviolet light and ozone, the dye is infiltrated deeply as possible in the ink receiving layer in the recording media, shielded from the effects of air and ultraviolet light and protected with an antioxidant and a stabilizer previously added in the ink receiving layer. Thus, the image storage stability is kept by using the ink in a large amount in which the color material density has been relatively lowered to assure (compensate) the depth of infiltration. Therefore, the amount of the ink required for outputting the image becomes necessarily large, and thus, not only it is difficult to downsize a cartridge, but also the printing cost is prone to become high.

From the above points, in the inkjet recording, currently it is very difficult to provide inexpensive specific papers or a printing method capable of high quality output.

Meanwhile, in recent years, pigment inks designed for inkjet recording have received attention. Because pigments are insoluble in water, it is common to use pigments that are broken into fine particles dispersed in a solvent. As the pigment inks for inkjet recording, pigment inks are mainly used in which pigment is dispersed in water for safety. Generally the water-based pigment ink has shortcomings, e.g., aggregation and precipitation easily occur compared to dye inks, various dispersion conditions and additives are required for making long term-storage stability to a level similar to that of the dye inks, the pigment ink is hardly used in a thermal head because a dispersion stabilizer causes cogation, and the coloring ranges of color materials are often narrower than those of dyes. However, the pigment dye has been highly noticed in terms of printing quality such as high black density, storage stability and water resistance after printing. It is thought that an inkjet printer using this pigment ink can make it possible to approximate a texture of a printed matter to the commercial printing because the color materials of the ink are close to the color materials of popular commercial printing inks. However, when the printing is actually performed using a conventional pigment ink on coating paper for the commercial printing, drying of the ink is not enough and the image is bled and the pigment is not fixed at all after drying. Thus, it has been the fact that, like conventional printing, the pigment ink can be used for printing only onto media with high absorbability such as plain papers and papers specific for the inkjet. This is because the design concept is not changed from the design concept for dye inks the pigment is addressed only from the viewpoint of the dye having the high light resistance, and characteristics of the pigment ink is not considered at all.
(Patent document 1) Japanese Patent Application Laid-Open (JP-A) No. 2005-212327
(Patent document 2) JP-A No. 11-078225
(Patent document 3) JP-A No. 2003-025717

DISCLOSURE OF THE INVENTION

The present invention aims at providing an ideal recording media, a recording media-ink set, an inkjet recoding method, and an inkjet recording apparatus, wherein a recorded matter which is inexpensive, excellent in density, gloss and image reliability, and close to commercial printed matter is obtained.

Coating papers specific for the inkjet (media specific for inkjet recording) for generally realizing high quality images are designed so that an ink receiving layer (coating layer) made from an inorganic pigment is present on the substrate surface or in the vicinity thereof and an image is formed by allowing the ink receiving layer itself to absorb ink (i.e., ink permeates in the ink receiving layer). This is deeply associated with the fact that development of the inkjet recording technology has advanced with dye inks.

Pigments have no or a little binding force and thus require an adhesive (binder) for binding, whereas dyes are coloring substances premised on originally permeating in a substance with an affinity with them and bond to it by means of covalent bonding, ion bonding, or Van der Waals' bonding. Therefore, in the case of the inkjet recording using the dye ink, the ink absolutely "stains" the substance in the receiving layer. This has produced technical challenges to be addressed—how uniformly the receiving layer is stained and how many substances in the receiving layer can be stained using the inkjet inks. Thus, in order to obtain an image with high density and high quality, a technology to cause ink to further permeate in the receiving layer, a technology to cause ink to more firmly bind to the substance in the receiving layer, and a technology to balance absorbability and color development property have been developed.

The current mainstream in the development of the paper specific for inkjet recording is the method for realizing a porous and highly transparent absorption layer. To realize this, materials having a low refraction index and high specific surface area must be used by all means, but expensive materials such as silica and alumina hydrate and the highly complicated production method must be used in the actual circumstance. Of course, the printing cost significantly increases, and the practical application to massive printing becomes difficult.

As a result of an extensive study on the inkjet recording method with low cost in the light of the above, the present inventors have invented the inkjet recording method with low cost based on a new design concept by combining the pigment ink having a high permeability with recording media having a low ink absorbability which are contrast to the conventional ones.

That is, the present inventors have found that only the solvent (water or an organic solvent) forming the ink is selectively permeated in a support by printing onto the recording media in which the ink absorbability (permeability) is reduced so that the pigment in the ink is not permeated as possible using the pigment ink with ultrahigh permeability in a small amount, and the sufficient density and drying property can be well-balanced even using the ink in a small amount by efficiently staying only the color material (pigment) in the ink on the surface of the recording media.

The present invention is based on the above findings of the present inventors, and means for solving the above problems are as follows.

<1> An inkjet recording method including: flying ink by application of stimulation to the ink to form an image on a recording media, wherein the recording media has at least one barrier layer having a thickness of 10 μm or less on at least one surface of a substrate comprising a cellulose pulp, the barrier layer contains 30% by mass or more of an inorganic pigment with a refraction index of 1.5 or more other than alumina, and the content of a pigment with a refraction index of less than 1.5 in the barrier layer is 10% by mass or less, wherein the ink contains either a pigment or colored fine particles as a coloring material and a coloring material fixing constituent, and the surface tension of the ink is 25 mN/m or less, and wherein the total amount of the ink on the recording media is 15 g/m$^2$ or less.

<2> The inkjet recording method according to <1>, wherein pores at a surface of the barrier layer in the recording media are 1 μm or less in diameter, and 40% or less of the surface of the barrier layer surface is occupied by the pores.

<3> The inkjet recording method according to one of <1> and <2>, wherein the recording media has the barrier layer whose surface has been polished.

<4> The inkjet recording method according to <3>, further comprising polishing, before recording, a surface of coated paper to produce the recording media having the barrier layer whose surface has been polished.

<5> The inkjet recording method according to any one of <1> to <4>, wherein the volume average particle diameter of either the pigment or the colored fine particles is 0.01 μm to 0.16 μm.

<6> The inkjet recording method according to any one of <1> to <5>, wherein the viscosity of the ink at 25° C. is 5 cps or more.

<7> The inkjet recording method according to any one of <1> to <6>, wherein the ink comprises a water-soluble organic solvent, and the water-soluble organic solvent is either a polyol compound having 8 or more carbon atoms or a glycol ether compound.

<8> The inkjet recording method according to <7>, wherein the polyol compound having 8 or more carbon atoms is at least one of 2-ethyl-1,3-hexanediol and 2,2,4-trimethyl-1,3-pentanediol.

<9> The inkjet recording method according to any one of <1> to <8> wherein the ink contains a surfactant, and the surfactant is at least one selected from the group consisting of the following general formulae (I), (II), (III), (IV), (V) and (VI):

$$R^1\text{—O—}(CH_2CH_2O)hCH_2COOM \qquad \text{General Formula (I)}$$

where $R^1$ represents an alkyl group, h represents an integer of 3 to 12, and M represents any one selected from alkali metal ion, quaternary ammonium, quaternary phosphonium and alkanolamine;

General Formula (II)

$$\begin{array}{l} CH_2COO\text{—}R^2 \\ | \\ MO_3SCHCOO\text{—}R^2 \end{array}$$

where $R^2$ represents an alkyl group; and M represents any one selected from alkali metal ion, quaternary ammonium, quaternary phosphonium and alkanolamine;

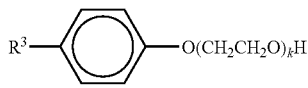
General Formula (III)

where $R^3$ represents a hydrocarbon group and k represents an integer of 5 to 20;

General Formula (IV)

where $R^4$ represents a hydrocarbon group and j represents an integer of 5 to 20;

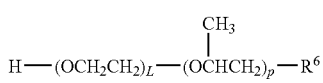
General Formula (V)

where $R^6$ represents a hydrocarbon group, and L and p represent integers of 1 to 20, respectively; and

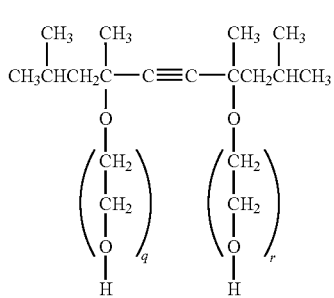
General Formula (VI)

where q and r each represents an integer of 0 to 40.

<10> The inkjet recording method according to any one of <1> to <9>, wherein the ink contains a wetting agent, and the wetting agent is at least one selected from polyol compounds, lactam compounds, urea compounds and saccharides.

<11> The inkjet recording method according to <10>, wherein the polyol compound is at least one selected from glycerine, ethylene glycol, diethylene glycol, triethylene glycol, tetraethylene glycol, polyethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,5-pentanediol, 1,6-hexanediol, 2-methyl-2,4-pentanediol, 1,2,4-butanetriol, 1,2,6-hexanetriol, thiodiglycol, pentaerythritol, trimethylolethane and trimethylolpropane.

<12> The inkjet recording method according to one of <10> and <11>, wherein the lactam compound is at least one selected from 2-pyrrolidone, N-methyl-2-pyrrolidone, N-hydroxyethyl-2-pyrrolidone and ε-caprolactam.

<13> The inkjet recording method according to any one of <10> to <12>, wherein the urea compound is at least one selected from urea, thiourea, ethylene urea and 1,3-dimethyl-2-imidazolidinone.

<14> The inkjet recording method according to any one of <10> to <13> wherein the saccharide is at least one selected from maltitose, sorbitose, gluconolactone and maltose.

<15> The inkjet recording method according to any one of <10> to <14> wherein the content of the wetting agent in the ink is 10% by mass to 50% by mass.

<16> The inkjet recording method according to any one of <10> to <15> wherein the ink is at least one selected from a cyan ink, a magenta ink, a yellow ink and a black ink.

<17> The inkjet recording method according to any one of <10> to <16> wherein the stimulation is at least one selected from heat, pressure, vibration and light.

<18> An inkjet recording apparatus including: ink flying means for flying ink by application of stimulation to the ink to form an image on a recording media, wherein the recording media has at least one barrier layer having a thickness of 10 μm or less on at least one surface of a substrate comprising a cellulose pulp, the barrier layer contains 30% by mass or more of an inorganic pigment with a refraction index of 1.5 or more other than alumina, and the content of a pigment with a refraction index of less than 1.5 in the barrier layer is 10% by mass or less, wherein the ink contains either a pigment or a colored fine particle as a coloring material, and a coloring material fixing constituent, and the surface tension of the ink is 25 mN/m or less, and wherein the total amount of the ink on the recording media is 15 $g/m^2$ or less.

<19> The inkjet recording apparatus according to <18>, further comprising polishing means for polishing a surface of coated paper to produce a recording media in which the pore diameter at a surface of a barrier layer is 1 μm or less and 40% or less of the surface of the barrier layer surface is occupied by pores.

<20> The inkjet recording apparatus according to one of <18> and <19>, wherein the stimulation is at least one selected from heat, pressure, vibration and light.

<21> A recording media-ink set composed of a recording media and an ink, wherein the recording media has at least one barrier layer having a thickness of 10 μm or less on at least one surface of a support comprising a cellulose pulp, the barrier layer contains 30% by mass or more of an inorganic pigment with a refraction index of 1.5 or less other than alumina, the content rate of a pigment with a refraction index of less than 1.5 in the barrier layer is 10% by mass or less, and wherein the ink contains either a pigment or a colored fine particle as a coloring material, and a coloring material fixing constituent, and the surface tension of the ink is 25 mN/m or less.

<22> The recording media-ink set according to <21>, wherein pores at a surface of the barrier layer in the recording media are 1 μm or less in diameter, and 40% or less of the surface of the barrier layer surface is occupied by the pores.

<23> The recording media-ink set according to one of <21> and <22>, wherein the recording media has the barrier layer whose surface has been polished.

<24> The recording media-ink set according to <23>, further comprising polishing, before recording, a surface of coated paper to produce the recording media having the barrier layer whose surface has been polished.

<25> The recording media-ink set according to any one of <21> to <24> wherein the volume average particle diameter of either the pigment or the colored fine particles is 0.01 μm to 0.16 μm.

<26> The recording media-ink set according to any one of <21> to <25>, wherein the viscosity of the ink at 25° C. is 5 cps or more.

<27> The recording media-ink set according to any one of <21> to <26>, wherein the ink comprises a water-soluble organic solvent, and the water-soluble organic solvent is either a polyol compound having 8 or more carbon atoms or a glycol ether compound.

<28> The recording media-ink set according to <27>, wherein the polyol compound having 8 or more carbon atoms is at least any of 2-ethyl-1,3-hexanediol and 2,2,4-trimethyl-1,3-pentanediol.

<29> The recording media-ink set according to any one of <21> to <28>, wherein the ink contains a surfactant, and the surfactant is at (V) and (VI):

   General Formula (I)

where $R^1$ represents an alkyl group; h represents an integer of 3 to 12; and M represents any one selected from alkali metal ion, quaternary ammonium, quaternary phosphonium and alkanolamine;

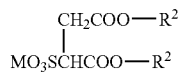   General Formula (II)

where $R^2$ represents an alkyl group, and M represents any one selected from alkali metal ion, quaternary ammonium, quaternary phosphonium and alkanolamine;

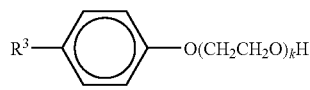   General Formula (III)

where $R^3$ represents a hydrocarbon group and k represents an integer of 5 to 20;

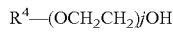   General Formula (IV)

where $R^4$ represents a hydrocarbon group and j represents an integer of 5 to 20;

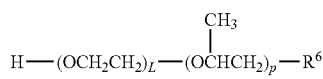   General Formula (V)

where $R^6$ represents a hydrocarbon group, and L and p each represents an integer of 1 to 20; and

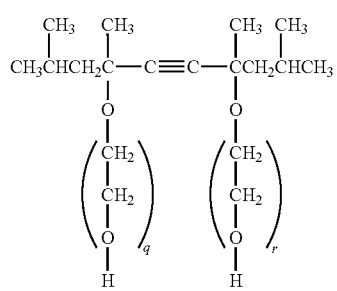   General Formula (VI)

where q and r each represents an integer of 0 to 40.

<30> The recording media-ink set according to any one of <21> to <29>, wherein the ink contains a wetting agent, and the wetting agent is at least one selected from polyol compounds, lactam compounds, urea compounds and saccharides.

<31> The recording media-ink set according to any one of <21> to <30>, wherein the polyol compound is at least one selected from glycerine, ethylene glycol, diethylene glycol, triethylene glycol, tetraethylene glycol, polyethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,5-pentanediol, 1,6-hexanediol, 2-methyl-2,4-pentanediol, 1,2,4-butanetriol, 1,2,6-hexanetriol, thiodiglycol, pentaerythritol, trimethylolethane and trimethylolpropane.

<32> The recording media-ink set according to one of <30> and <31>, wherein the lactam compound is at least one selected from 2-pyrrolidone, N-methyl-2-pyrrolidone, N-hydroxyethyl-2-pyrrolidone and ε-caprolactam.

<33> The recording media-ink set according to any one of <30> to <32>, wherein the urea compound is at least one selected from urea, thiourea, ethylene urea and 1,3-dimethyl-2-imidazolidinone.

<34> The recording media-ink set according to any one of <30> to <33>, wherein the saccharide is at least one selected from maltitose, sorbitose, gluconolactone and maltose.

<35> The recording media-ink set according to any one of <30> to <34>, wherein the content of the wetting agent in the ink is 10% by mass to 50% by mass.

<36>. The recording media-ink set according to any one of <21> to <35>, wherein the ink is at least one selected from a cyan ink, a magenta ink, a yellow ink and a black ink.

<37> A recording media comprising: a substrate comprising a cellulose pulp; and at least one barrier layer having a thickness of 10 μm or less on at least one surface of the substrate, wherein the barrier layer contains 30% by mass or more of an inorganic pigment with a refraction index of 1.5 or more other than alumina, and the content of a pigment with a refraction index of less than 1.5 in the barrier layer is 10% by mass or less, and wherein pores at a surface of the barrier layer is 1 μm or less in diameter and 40% or less of the surface of the barrier layer is occupied by the pores.

<38> The recording media according to <37>, wherein the recording media has the barrier layer whose surface has been polished.

BEST MODE FOR CARRYING OUT THE INVENTION

Figure 1:
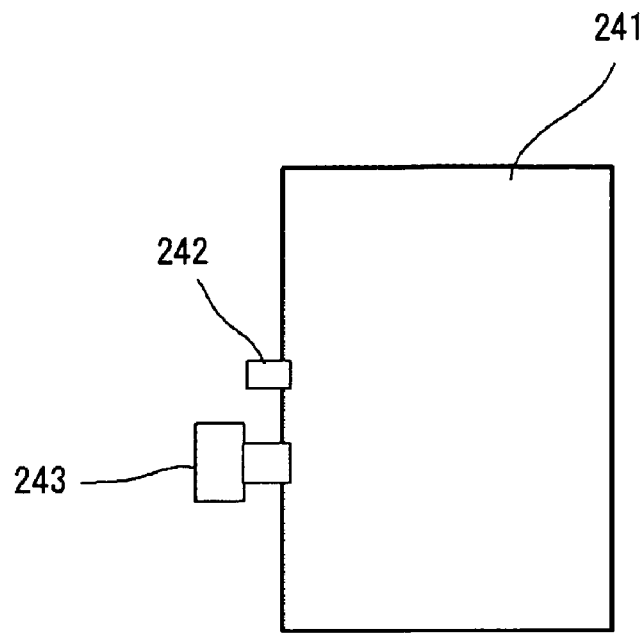
FIG. 1 is a schematic view showing one example of an ink cartridge of the present invention.

<Inkjet Recording Apparatus and Inkjet Recording Method>

The inkjet recording apparatus of the present invention has at least ink flying means and polishing means, and further has other means optionally selected, e.g., stimulation generating means and controlling means, if necessary.

The inkjet recording method of the present invention has at least an ink flying step and a polishing step, and further has other step(s) optionally selected, e.g., a stimulation generating step and a controlling step, if necessary.

The inkjet recording method of the present invention can be suitably carried out by the inkjet recording apparatus of the present invention, and the ink flying step can be suitably performed by the ink flying means. The other step(s) can be suitably performed by the other means.

—Ink Flying Step and Ink Flying Means—

The ink flying step is the step in which an image is recorded on a recording media by applying a stimulation to an ink to fly the ink.

The ink flying means is the means in which an image is recorded on the recording media by applying the stimulation to the ink to fly the ink. The ink flying means is not particularly limited, and examples thereof include various nozzles for jetting the ink.

In the present invention, it is preferable that at least portions of a liquid room section, a fluid resistance section, a vibration plate and a nozzle member in the inkjet head be formed from materials containing at least any one of silicon and nickel.

The nozzle diameter of the inkjet head is preferably 30 µm or less and more preferably 1 µm to 20 µm.

It is preferable to have a subtank for supplying the ink on the inkjet head and constitute so that the ink is refilled in the subtank from an ink cartridge through a supply tube.

The stimulation can be generated from the stimulation generating means. The stimulation is not particularly limited, can be optionally selected depending on a purpose, and includes heat, pressure, vibration and light. These may be used alone or in combination of two or more. Among them, heat and pressure are suitably included.

Examples of the stimulation generating means include heating apparatuses, pressurizing apparatuses, piezoelectric elements, vibration generating apparatuses, ultrasound oscillators and light. Specifically, for example, piezoelectric actuators such as piezoelectric elements, thermal actuators utilizing phase change achieved by using the membrane boiling of a liquid using an electro-thermal exchange element such as an exothermic resistance, shape-memory alloy actuators using metallic phase change by thermal change, and electrostatic actuators using electrostatic power are included.

A mode of the ink flying is not particularly limited, varies depending on types of the stimulation, and includes, for example a method in which when the stimulation is "heat", heat energy corresponding to a recording signal is imparted to the ink in a recording head using a thermal head, air bubbles are generated in the ink by the heat energy and the ink is jetted/sprayed as liquid drops from a nozzle pore in the recording head by pressure of the air bubbles. When the stimulation is "pressure", for example, the method in which voltage is applied to the piezoelectric element adhered at a position called a pressure room in an ink flow path in the recording head to bend the piezoelectric element and reduce a volume of the pressure room and the ink is jetted/sprayed as liquid drops from a nozzle pore in the recording head by pressure of the air bubbles is also included.

The size of the liquid drop of the flied ink is preferably 1 pl to 40 pl, its jetting/spraying speed is preferably 5 m/s to 20 m/s, its driving frequency is preferably 1 kHz or more, and its resolution is preferably 300 dpi or more.

The controlling means is not particularly limited as long as it can control operation of the respective means, can be optionally selected depending on the purpose, and includes, for example, instruments such as sequencers and computers.

<Recording Media>

The recording media of the present invention has at least one barrier layer having an thickness of 10 µm or less at least on one surface of a support comprising a cellulose pulp, and if necessary further has other layer(s).

The barrier layer contains 30% by mass or more of an inorganic pigment with a refraction index of 1.5 or more other than alumina hydrate, and the content of a pigment with a refraction index of less than 1.5 in the barrier layer is 10% by mass or less.

The recording media is made by providing (e.g., applying) a barrier layer (color material permeation prevention layer) on a substrate, so-called a paper base using cellulose pulp as a major ingredient. By assimilating this barrier layer to the appearance of a printer sheet, it becomes possible to obtain a printed matter having a texture close to that of popular commercial printed matters. To suppress ink permeability, the pore size, pore diameter and the thickness of the barrier layer are limited for optional permeability (barrier property).

It is required that the barrier layer have a certain thickness or less for facilitating the separation of the color material in the ink from an ink solvent. The thickness is required to be 10 µm or less, and is preferably 5 µm or less. When the barrier layer is greater than 10 µm in thickness, it takes a long time for ink solvent to permeate the barrier layer, and therefore, beading and bleeding easily occur, the image quality is lowered, and offset easily occurs because of poor drying property.

Because of the necessity to make the barrier layer thin, for preventing a show-through (a phenomenon where the color of the printed color material is seen through from the backside) of the color material, it is necessary to abundantly contain the inorganic pigment having the high refraction index and high opacifying property in the barrier layer, in contrast to conventional inkjet media. Thus, it is necessary for the barrier layer to contain the inorganic pigment with a refraction index of 1.5 or more at 30% or more. The barrier layer may contain silica which is used in the conventional inkjet media and is the material having a low refraction index and low opacifying property. However, it is necessary that the amount of silica and the like be 10% by mass or less because show-through becomes significant and the cost becomes high when the amount of the pigment having a high transparency is increased.

From the above, by using the pigment having a high refraction index as a white pigment which constitutes the barrier layer, it is possible to reduce show-through and further reduce the cost even when the thickness of the barrier layer is thinned.

Some types of alumina hydrate are pigments having a high refraction index. However, when an alumina hydrate with excessively high oil absorption is contained in a large amount, the ink solvent becomes difficult to be transferred from the barrier layer to the base. The alumina hydrate which has absorbed the solvent in a large amount is not desirable in the present invention because it causes discoloration and image bleeding due to migration of the pigment in a long term storage.

A function required for the barrier layer of the present invention is to separate the pigment and the solvent in the ink and allow only the solvent to permeate in the base, and therefore, it is preferable that the barrier layer have fine pores. When the barrier layer has no pores at all, a phenomenon that the ink is not dried easily occurs because the solvent ingredients in the ink slowly permeates. But, when the pore diameter is too large or the number of the pores is too large, the function to separate the pigment in the ink is reduced, the image density is lowered, and the pigment present on the media surface after printing migrates to a media inside with time to cause color change. Thus, the pore diameter is preferably 1 μm or less, and the area occupied by the pores at the barrier layer surface is preferably 40% or less.

Here, the pore diameter and the area occupied by the pores can be measured by observing the surface of an SEM photograph. An image of a pore portion is binarized based on the surface photograph to calculate the diameter and an area ratio. As the SEM, an electrolysis radiation scanning electron microscope (JSM-7400F supplied from JEOL Ltd.) was used, and PopImaging (Ver. 3.51 supplied from Digital Being Kids) was used for image processing.

The organic pigment in the barrier layer is not particularly limited, can be optionally selected depending on the purpose, and examples thereof include magnesium carbonate, talc, kaolin, illite, clay, calcium carbonate, calcium sulfite, titanium white, and titanium dioxide. Among these pigments, the use of one having as high a refraction index as possible makes it is possible to reduce the thickness of the barrier layer. Among them, it is preferable to use calcium carbonate and kaolin in terms of cost. These pigments can also be combined with other pigments not listed.

Kaolin is preferable because it is excellent in gloss expressing property and a texture close to that of the sheet for offset printing can be made. There are many types of kaolin: delaminated kaolin, burned kaolin, and engineered kaolin by surface modification and the like. Considering the gloss expressing property, it is preferable that kaolin having a particle size distribution in which the amount of kaolin with a particle diameter of 2 μm or less is 80% by mass or more occupied 50% by mass or more relative to the entire kaolin. The amount of kaolin to be combined is preferably 50% by mass or more. When it is less than 50% by mass, a sufficient effect is difficult to be expected in glossy degree. The upper limit is not particularly limited, but considering fluidity, particularly a thickening property of kaolin under high shearing power, the amount at 90% by mass or less is more suitable in terms of coating suitability.

These inorganic pigments having a high refraction index may be combined with silica and organic pigments having a low refraction index. Examples of the organic pigments include water-soluble dispersions of styrene-acryl copolymer particles, styrene-butadiene copolymer particles, polystyrene particles, and polyethylene particles. These organic pigments may be used in mixture of two or more. It is preferable that the amount of the organic pigment to be added is 2 parts by mass to 5 parts by mass relative to 100 parts by mass of the inorganic pigment. Since the organic pigment is excellent in gloss expressing property and its specific gravity is smaller than that of the inorganic pigment, it is possible to obtain a coating layer which is highly bulky, highly glossy and good in surface coating property. However, when its amount is less than 2 parts by mass, no effect is obtained whereas when it exceeds 5 parts by mass, the show through easily occurs and it is not economical in terms of cost.

The organic pigments are categorized into a solid type, a hollow type, and a doughnut type according to their shapes. In the light of balance of the gloss expressing property, the surface coating property and the fluidity of the coating solution, the average particle diameter is preferably in the range of 0.2 μm to 3.0 μm, and the hollow type having a void proportion of 40% or more is suitably employed.

The binder of the barrier layer used in the present invention is not particularly limited as long as it has a strong adherent force with the pigment and the base paper which constitute the barrier layer and it is a water-based resin or an emulsion which does not cause blocking.

The water-based resin includes, for example, polyvinyl alcohol; starches such as oxidized starch, esterified starch, enzyme-modified starch and cationized starch; casein, soy bean proteins; cellulose derivatives such as carboxymethylcellulose and hydroxyethylcellulose; styrene-acryl copolymer resins, isobutylene-maleic acid anhydrate copolymer resins, acryl emulsions, vinyl acetate emulsions, vinylidene chloride emulsions, polyester emulsions, styrene-butadiene copolymer latex, and acrylonitrile-butadiene copolymer latex. Among them, it is preferable to use starch or styrene-butadiene copolymer latex in terms of cost.

The styrene-butadiene copolymer latex may be the copolymer latex generally used for paper coating, in which styrene and butadiene are contained as monomers, if necessary other monomers are copolymerized and the copolymer is modified by chemical reaction. As the other monomers, acrylic acid, methacrylic acid, alkyl ester of acrylic acid or methacrylic acid, acrylonitrile, maleic acid, fumaric acid, and vinyl-based monomer such as vinyl acetate are often used. A crosslinking agent such as methylolized melamine, methylolized urea, methylolized hydroxypropyleneurea, and isocyanate may also be contained, and the copolymer containing a unit such as N-methylol acrylamide and having self-crosslinking property may be used. These may be used alone or in combination of two or more.

The amount of the water-based resin (binder) added in the barrier layer used in the present invention is preferably 50 by mass to 70% by mass and more preferably 55% by mass to 60% by mass relative to the solid content of the barrier layer. When the amount is small, the adherent force becomes insufficient, and the occurrence of powder omission owing to strength reduction of the barrier layer and reduction of internal bond strength is concerned.

Other ingredients can be added to the barrier layer as needed in the range in which the objects and the effects of the present invention are not impaired. As the other ingredients, various aids such as dispersants, thickeners, water holding agents, anti-foaming agents and water resistant additives combined with usual pigments for coating papers, and additionally additives such as pH adjusters, preservatives, antioxidants and cationic organic compounds may be used.

The surfactant used for the barrier layer is not particularly is limited, can be optionally selected depending on the purpose, and any of anionic activators, cationic activators, ampholytic activators and nonionic activators can be used. Among them, the nonionic activators are particularly preferable.

The nonionic activators include, for example, higher alcohol ethylene oxide adducts, alkyl phenol ethylene oxide adducts, fatty acid ethylene oxide adducts, polyvalent alcohol ester ethylene oxide adducts, higher aliphatic amine ethylene oxide adducts, fatty acid amide ethylene oxide adducts, ethylene oxide adducts of fats and oils, polypropylene glycol ethylene oxide adducts, fatty acid esters of glycerol, fatty acid esters of pentaerythritol, fatty acid esters of sorbitol and sorbitan, fatty acid esters of sucrose, alkyl ethers of polyvalent alcohols, and fatty acid amides of alkanol amines. These may be used alone or in combination of two or more.

The polyvalent alcohol is not particularly limited, can be optionally selected depending on the purpose, and include, for example, glycerine, trimethylolpropane, pentaerythrit, sorbitol and sucrose. For the ethylene oxide adduct, those obtained by substituting a part of ethylene oxide with alkylene oxide such as propylene oxide or butylene oxide in the range in which its water-solubility can be kept are also effective. The substitution ratio is preferably 50% or less. An HLB (hydrophilicity-to-lipophilicity ratio) of the nonionic activator is preferably 4 to 15 and more preferably 7 to 13.

The cationic organic compound is not always necessary to be combined, is not particularly limited, and can be optionally selected and used depending on the purpose.

The cationic organic compound includes, for example, dimethylamine epichlorohydrin polycondensates, dimethylamine ammonia epichlorohydrin condensates poly(methacrylic acid trimethylaminoethyl methyl sulfate salts), diallylamine hydrochloride salts, acrylamide copolymers, poly(diallylamine hydrochloride salt sulfur dioxide), polyallylamine hydrochloride salts, poly(allylamine hydrochloride salt diallylamine hydrochloride salt), acrylamide diallylamine copolymers, polyvinylamine copolymers, dicyandiamide, dicyandiamide ammonium chloride urea formaldehyde condensates, polyalkylenepolyamine dicyandiamide ammonium salt condensates, dimethyldiallylammonium chloride, polydiallylmethylamine hydrochloride salts, poly(diallyldimethylammonium chloride), poly(diallyldimethylammonium chloride sulfur dioxide), poly(diallyldimethylammonium chloride diallylamine hydrochloride salt derivative), acrylamide diallyldimethylammonium chloride copolymers, acrylate salts, acrylamide diallylamine hydrochloride copolymers, polyethyleneimine, ethyleneimine derivatives of acrylamine polymers, and polyethyleneimine alkylene oxide modificates. These may be used alone or in combination of two or more.

As the substrate used in the present invention, a chemical pulp, a mechanical pulp and a pulp of collected used paper are used by mixing in an optional proportion. Those obtained by papermaking raw materials in which an internally added sizing agent, a process yield improver and a paper strength augmenting agent have been added as needed using a fourdrinier former, a twin wire former of a gap type, or a hybrid former in which a last half of a fourdrinier portion is composed of the twin wire are used.

As the pulps used for the substrate, virgin chemical pulps (CP) include, for example, virgin chemical pulps made by chemically treating wood materials such as broadleaf tree bleached craft pulps, needle leaved tree bleached craft pulps, broadleaf tree unbleached craft pulps, needle leaved tree unbleached craft pulps, broadleaf tree bleached sulfite pulps, needle leaved tree bleached sulfite pulps, broadleaf tree unbleached sulfite pulps and needle leaved tree unbleached sulfite pulps, or other fiber materials. As virgin mechanical pulps (MP), for example, the virgin mechanical pulps such as ground pulps, chemiground pulps, chemi-mechanical pulps and semi-chemical pulps made by mainly mechanically treating the wood materials and the other fiber materials may be contained.

Furthermore, used papers may be used, and raw materials of the used paper pulps include super white, white with rule marks, cream white, cards, particular white, medium white, simili paper, color white, Kent paper, special high cut, another high cut, newspapers and journals shown in used paper standard quality specification table in Paper Recycling Promotion Center. Specifically, non-coated computer sheets, printer sheets such as thermal papers and pressure-sensitive papers which are information-related sheets; used OA sheets such as PPC sheets; used papers of papers or plate papers of coated papers such as art papers, coating papers, finely coating papers and mat papers; and non-coated papers such as quality papers, color high quality papers, notepapers, letter papers, packing papers, facsimile papers, medium quality papers, newspapers, fancy-figured papers, super ceremony papers, structure papers, pure white rolling papers and milk cartons are included, and chemical pulp papers and high process yield pulp-containing papers are included. These may be used alone or in combination of two or more.

The used paper pulp is generally produced by combining the following 4 steps:
(1) a dissociation step in which used paper is crumbed into fibers by treatment with a mechanical force and chemicals, and printed inks are removed from the fibers;
(2) a cleaning step in which foreign matters (plastics and the like) and dusts contained in the used paper are removed using a screen or a cleaner;
(3) a deinking step in which the printed inks removed from the fibers using the surfactant are eliminated with a floatation method or a washing method; and
(4) a bleaching step in which the white degree of the fibers is enhanced using an oxidation action or a reduction action.

When the used paper pulp is mixed, its the proportion in the total pulp is preferably 40% or less to prevent curling after printing.

As a filler used in the substrate used in the present invention, calcium carbonate is effective, and inorganic fillers such as kaolin, burned clay, pyrophylite, sericite, silicates such as talc and organic pigments such as satin white, barium sulfate, calcium sulfate, zinc sulfide, plastic pigments and urea resins can also be combined.

The internally added sizing agent used in the substrate used in the present invention is not particularly limited, and can be optionally selected from the publicly known internally added sizing agents used for recording sheets for the inkjet and used. The internally added sizing agent can include, for example, rosin emulsion-based sizing agents. The internally added sizing agent used when papermaking the support includes, for example, neutral rosin-based sizing agents used for neutral papermaking, alkenyl succinic acid anhydrate (ASA), alkyl ketene dimers (AKD) and petroleum resin-based sizing agents. Among them, the neutral rosin sizing agent and alkenyl succinic acid anhydrate are particularly preferable. The alkyl ketene dimer is effective in a small amount because its sizing effect is high, but a friction coefficient on the surface of the recording sheet (media) is lowered and the sheet is easily slid, and thus the alkyl ketene dimer is not preferable in terms of feeding property upon inkjet recording in some cases.

The amount of the internally added sizing agent to be used is preferably 0.1 parts by mass to 0.7 parts by mass relative to 100 parts by mass of absolute dry pulp.

As an internally added filler used for the substrate, for example, a conventionally and publicly known pigment is used as a white pigment.

The white pigment includes, for example, white inorganic pigments such as light calcium carbonate, heavy calcium carbonate, kaolin, clay, talc, calcium sulfate, barium sulfate, titanium dioxide, zinc dioxide, zinc sulfide, zinc carbonate, satin white, aluminium silicate, diatomaceous earth, calcium silicate, magnesium silicate, synthetic silica, aluminium hydroxide, alumina, lithopone, zeolite, magnesium carbonate and magnesium hydroxide; and organic pigments such as styrene-based plastic pigments, acrylic plastic pigments, polyethylene, microcapsules, urea resins and melamine resins. These may be used alone or in combination of two or more.

<Production Method of Barrier Layer>

The method of providing a barrier layer by coating method on a substrate is not particularly limited, can be optionally selected depending on the purpose, and for example, the method of directly applying, the method of transferring one once applied on the other substrate onto the base paper, and the method of spraying by a spray can be utilized. The method of directly applying includes, for example, film transfer systems such as a roll coater method, an air knife coater method, a gate roll coater method, a size press method, a simsizer method and a rod metalling size press coater method; and blade coater systems by fountain or roll application.

A drying treatment of the barrier layer can be performed using, for example, a hot wind drying furnace or a heating drum. Furthermore, in order to smoothen the surface or increase the surface strength, surface finish may be given using a calendar apparatus (super calendar, soft calendar, gloss calendar).

<Inks>

The ink used in the present invention contains one of a pigment and colored fine particles as the color material, and a color material fixing constituent and contains a water-soluble organic solvent, a wetting agent, a surfactant, and if necessary other ingredient(s).

The ink of the present invention must be highly permeable, and the condition therefore requires the surface tension of 25 mN/m or less. When the surface tension is larger than 25 mN/m, no image with high quality is obtained because ink slowly permeates to cause a phenomenon that an image is bled. The lower the surface tension, the more the degree of separation of the pigment from the solvent. Thus, lower surface tension is more preferable. The surface tension of ink can be easily controlled by the amounts of a permeating agent (EHD) and a fluorine-based surfactant (e.g., FS300) to be added.

The ink used in the present invention contains the color material fixing constituent in the ink. The color material fixing constituent keeps the adhesive force between the pigment and the media surface and between the pigments at a certain value or more. When this color material fixing constituent is not contained, the pigment is easily peeled after printing, and thus the reliability of the image can not be kept. This color material fixing constituent may be an agent which is low molecular ones, but is preferably a resin emulsion or an ultraviolet light curable resin. This agent may be a part of color material which is covering colorant particle such as a capsule or an adsorbent.

In the present invention, in order to prevent the infiltration of the pigment in the ink, to efficiently and unevenly distribute the pigment particles in the vicinity of the media surface, and to ensure the drying property of the ink, the total amount of the ink is necessary to be limited strictly. Because if the large amount of ink is used as in the conventional inkjet recording, the separation ability of the pigment in the barrier layer is not enough, and thus the pigment in the ink is permeated together with the ink solvent or the permeation of the solvent ingredient in the ink is not enough and thus the drying property is largely troubled.

The total amount of the ink required for eliciting the function of the barrier layer is 15 $g/m^2$ and preferably 12 $g/m^2$ or less. The total amount of the ink can be easily controlled by the amounts of the permeating agent (EHD) and the fluorine-based surfactant (e.g., FS300) to be added. By reducing the total amount of the ink required for printing, it becomes possible to reduce the volume of the ink cartridge and downsize the apparatus compared with the conventional inkjet printer. If the size of the cartridge is the same as the conventional one, the frequency at which the ink cartridge needs to be replaced can be reduced and the printing with lower cost becomes possible. Basically, the fewer the total amount of the ink is, the more the pigment separation ability of the barrier layer is elicited. However, when the total amount of the ink is too small, the dot diameter after the printing becomes too small. Thus it is preferable to determine the total amount of the ink in this range depending on the type of image to be produced.

Here, the total amount of ink was measured using a mass method. Specifically, a square of 5 cm×20 cm was printed on Type 6200 (Ricoh Co., Ltd.) which was a PPC sheet. Immediately after printing, the mass of the sheet was measured, the mass of the sheet before printing was subtracted, and the resulting value was multiplied by 100. This value was made the total amount of ink.

The ink can be printed on the conventional void type media specific for inkjet recording. But, since the ink absorption speed is too fast compared with that for the recording media of the present invention, after the ink liquid drop is jetted on the media surface, the solvent is permeated before the dot is wetted and spread, and thus the dot diameter becomes small. As a result, the density is easily lowered and a particulate feeling is easily increased. Thus, the printing speed is reduced and the amount of the consumed ink is increased because to produce a high quality image, it is necessary to print out with increased resolution compared with the recording media of the present invention. Therefore, it is preferable to use the recording media of the present invention.

<Color Materials (Coloring Agents)>

As the coloring agent, it is preferable to use at least one of a pigment and colored fine particles. As the colored fine particles, a water dispersion of polymer fine particles in which the color material of at least one of a pigment and a dye has been contained is suitably used.

Here, the "the color material has been contained" means a state where the color material has been included in the polymer fine particle or a state where the color material has been adsorbed on the surface of the polymer fine particle. The color material is not particularly limited as long as it is water-insoluble or water-hardly soluble and can be absorbed by the polymer, and can be optionally selected depending on the purpose. Here, the "water-insoluble or water-hardly soluble" means that 10 parts by mass or more of the color material is not dissolved in 100 parts by mass of water at 20° C. "Dissolve" means that separation and precipitation of the color material are not visually observed in a surface layer or a lower layer of the aqueous solution. The volume average particle diameter of the polymer fine particles in which the color material has been contained is preferably 0.01 μm to 0.16 μm. When the diameter is 0.01 μm or less, the particle diameter comes close to that of the dye, and thus, light resistance reduced and feathering becomes likely to occur. The fine particle is also easily permeated through the barrier layer and causes density reduction. When it is 0.30 μm or more, clogging at jetting openings and filters in the printer occurs, and the jetting stability can not be obtained.

The other coloring agent includes pigments. The pigments are not particularly limited, can be optionally selected depending on the purpose, and may be, for example either inorganic pigments or organic pigments. The inorganic pigments include, for example, titanium oxide, iron oxide, calcium carbonate, barium sulfate, aluminium hydroxide, barium yellow, cadmium red, chromium yellow, carbon black, Prussian blue and metal powders. Among them, carbon black and the like are preferable. Carbon black includes, for example, those produced by publicly known methods such as a contact method, a furnace method and a thermal method.

The organic pigments include, for example, azo pigments, polycyclic pigments, dye chelates, nitro pigments, nitroso pigments and aniline black. Among them, the azo pigments and the polycyclic pigments are preferable. The azo pigments include, for example, azo lakes, insoluble azo pigments, condensed azo pigments and chelated azo pigments. The polycyclic pigments include, for example, phthalocyanine pigments, perylene pigments, perinone pigments, anthraquinone pigments, quinacridone pigments, dioxadine pigments, indigo pigments, thioindigo pigments, isoindolinone pigments, quinophlalone pigments, azomethine pigments and rhodamine B lake pigments. The dye chelates include, for example, basic dye type chelates and acidic dye type chelates.

The colors of the pigments are not particularly limited, can be optionally selected depending on the purpose; for example pigments for black and pigments for color printing are exemplified. These may be used alone or in combination of two or more.

The pigments for black include, for example, carbon black (C.I. pigment black 7) such as furnace black, lamp black, acetylene black and channel black, metals such as copper, iron (C.I. pigment black 11) and titanium oxide, and organic pigments such as aniline black (C.I. pigment black 1).

As the carbon black used for the black pigment ink, the carbon black produced by the furnace method or the channel method and having a primary particle diameter of 15 μm to 40 μm, a specific surface area of 50 m$^2$/g to 300 m$^2$/g by BET method, a DBP oil absorption of 40 mL/100 g to 150 mL/100 g, a volatile portion of 0.5% to 10% and pH 2 to 9 is preferable.

Commercially available products of such a carbon black are not particularly limited, can be optionally selected depending on the purpose, and include, for example, No. 2300, No. 900, MCF-88, No. 33, No. 40, No. 45, No. 52, MA7, MA8, MA100, No. 2200B (supplied from Mitsubishi Chemical Corporation); Raven 700, Raven 5750, Raven 5250, Raven 5000, Raven 3500 and Raven 1255 (supplied from Colombia); Regal 400R, Regal 330R, Regal 660R, MogulL, Monarch 700, Monarch 800, Monarch 880, Monarch 900, Monarch 1000, Monarch 1100, Monarch 1300 and Monarch 1400 (supplied from Cabot); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (supplied from Degussa).

As the pigments for color printing, pigments for the yellow ink include, for example, C.I. pigment yellow 1 (fast yellow G), 2, 3, 12 (disazo yellow AAA), 13, 14, 16, 17, 23, 24, 34, 35, 37, 42 (yellow iron oxide), 53, 55, 73, 74, 75, 81, 83 (disazo yellow HR), 93, 95, 97, 98, 100, 101, 104, 108, 109, 110, 114, 117, 120, 128, 129, 138, 150, 151, 153 and 154.

Pigments for the magenta ink include, for example, C.I. pigment red 1, 2, 3, 5, 7, 12, 17, 22 (brilliant fast scarlet), 23, 31, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 92, 101 (colcothar), 104, 105, 106, 108 (cadmium red), 112, 114, 122 (dimethyl quinacridone), 123, 146, 149, 166, 168, 170, 172, 177, 178, 179, 184, 185, 190, 193, 202, 209 and 219.

Pigments for the cyan ink include, for example, C.I. pigment blue 1, 2, 3, 15 (copper phthalocyanine blue R), 15:1, 15:2, 15:3 (phthalocyanine blue G), 15:4, 15:6 (phthalocyanine blue E), 15:34, 16, 17, 1, 22, 56, 60, 63, C.I. bat blue 4 and C.I. bat blue 60.

Pigments for intermediate colors for red, green and blue include C.I. pigment red 177, 194, 224, C.I. pigment orange 43, C.I. pigment violet 3, 19, 23, 37, C.I. pigment green 7 and 36.

As the pigments, self-dispersible pigments are suitable used which can be stably dispersed without using a dispersant in which at least one hydrophilic group is bonded to the pigment surface directly or though another atomic group. As a result, the use of a dispersant for dispersing pigment, as required by the conventional ink, is avoided. The self-dispersible pigment preferably has an ionic character, and suitably has an anionic or cationic charge.

The volume average particle diameter of the self-dispersible pigment is preferably 0.01 μm to 0.16 μm in the ink.

The anionic hydrophilic group includes, for example, —COOM, —SO$_3$M, —PO$_3$HM, —PO$_3$M$_2$, —SO$_2$NH$_2$, —SO$_2$NHCOR (where M represents a hydrogen atom, an alkali metal, ammonium or organic ammonium. R represents an alkyl group having 1 to 12 carbon atoms, a phenyl group which may have substituents, or a naphthyl group which may have substituents). Among them, it is preferable to use ones in which —COOM or —SO$_3$M is bound to the color pigment surface.

In "M" in the hydrophilic group, the alkali metal includes, for example, lithium, sodium and potassium. The organic ammonium include, for example, monomethyl ammonium, dimethyl ammonium, trimethyl ammonium, monoethyl ammonium, diethyl ammonium, triethyl ammonium, monomethanol ammonium, dimethanol ammonium and trimethanol ammonium. As the method of obtaining the color pigment having the anionic charge, the method of introducing —COONa onto the color pigment surface includes, for example, the method of oxidation-treating the color pigment with sodium hypochlorite, the method by sulfonation and the method of reacting a diazonium salt.

As the cationic hydrophilic group, for example, a quaternary ammonium group is preferable, the quaternary ammonium groups shown in the following Table 1 are more preferable, and the color material in which any of these has been bound to the pigment surface is suitable.

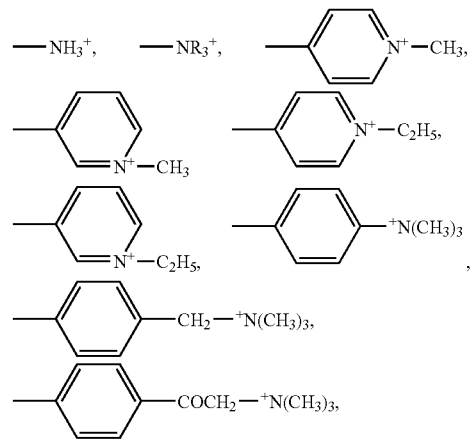

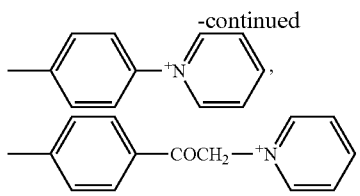

For the method of producing the self-dispersible cationic carbon black to which the hydrophilic group has been bound, the method of binding N-ethylpyridyl group represented by the following structural formula is not particularly limited, can be optionally selected depending on the purpose, and includes, for example, the method of treating the carbon black with 3-amino-N-ethylpyridium bromide.

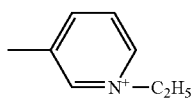

In the present invention, the hydrophilic group may be bound to the surface of the carbon black through another atomic group. Examples of the atomic group include, for example, alkyl groups having 1 to 12 carbon atoms, phenyl groups which may have substituents and naphthyl groups which may have substituents. Specific examples thereof when the hydrophilic group is bound to the surface of the carbon black through the other atomic group include, for example, —$C_2H_4$COOM (where M represents an alkali metal or quaternary ammonium), —PhSO$_3$M (where Ph represents phenyl group and M represents an alkali metal or quaternary ammonium), and —$C_5H_{10}NH_3^+$.

In the present invention, a pigment dispersion using a pigment dispersant can also be used.

As the pigment dispersant, hydrophilic polymer compounds include plant polymers such as gum acacia, tragacanth gum, guar gum, karaya gum, locust bean gum, arabinogalactan, pectin and quince seed starch; sea weed polymers such as alginic acid, carrageenan and agar; animal polymers such as gelatin, casein, albumin and collagen; microbial polymers such as xantene gum and dextran in natural system. In semi-synthetic system, cellulose polymers such as methylcellulose, ethylcellulose, hydroxyethylcellulose, hydroxypropylcellulose and carboxymethylcellulose; starch polymers such as sodium starch glycolate and sodium starch phosphate ester; and sea weed polymers such as sodium alginate and alginate propylene glycol ester are included. In pure synthetic system, vinyl polymers such as polyvinyl alcohol, polyvinyl pyrrolidone, and polyvinyl methyl ether; acrylic resins such as non-crosslinked polyacrylamide, polyacrylic acid or alkali metal salts thereof and water-soluble styrene-acryl copolymer resins; polymer compounds having the salt of the cationic functional group in the side chain, such as water-soluble styrene-maleic acid copolymer resins, water-soluble vinyl naphthalene-acryl copolymer resins, water-soluble vinyl naphthalene maleic acid copolymer resins, polyvinyl pyrrolidone, polyvinyl alcohol, alkali metal salts of β-naphthalene sulfonate formalin condensate and quaternary ammonium and amino groups; and natural polymers such as shellac are included. Among them, acrylic resins obtained by polymerizing acrylic acid, methacrylic acid or ester thereof; and copolymers having carboxyl group obtained by copolymerizing acrylic acid, methacrylic acid or styrene with a monomer having the other hydrophilic group are particularly preferable.

The weight average molecular weight of the copolymer is preferably 3,000 to 50,000, more preferably 5,000 to 30,000 and still more preferably 7,000 to 15,000. The mixing ratio of the pigment to the dispersant is preferably 1:0.06 to 1:3 and more preferably 1:0.125 to 1:3.

It is a preferable combination for obtaining the suitable dot diameter to use the polymer dispersant and the self-dispersible pigment simultaneously. The reason for it is not clear, but may be as follows.

The permeation into the recording paper is inhibited by containing the polymer dispersant. On the other hand, since the aggregation of the self-dispersible pigments is inhibited by containing the polymer dispersant, the self-dispersible pigment can be spread in a horizontal direction smoothly. Thus, it is thought that the dots can be spread widely and thinly to form ideal dots.

The dispersibility can also be imparted by coating the pigment with the resin having the hydrophilic group to microcapsulate it.

As the method of microcapsulating the water-insoluble pigment by coating with organic polymers, it is possible to use all methods known conventionally and publicly. The methods known conventionally and publicly include chemical production methods, physical production methods, physicochemical methods and mechanical production methods. Specifically, the following methods are included.

(1) Interface polymerization method (method in which two different monomers or two different reactants are dissolved separately in a dispersion phase and a continuous phase, and a wall membrane is formed by reacting them at their interface).

(2) In situ polymerization method (method in which a wall membrane is formed by supplying liquid or gaseous monomers and a catalyst, or two reactive substances from any one side of a continuous phase nuclear particle side to cause a reaction).

(3) In-liquid cured coating method (method in which a wall membrane is formed by insolubilizing drops of a polymer solution containing a core substance particles by a curing agent in liquid).

(4) Coacervation (phase separation) method (method in which a wall membrane is formed by separating a polymer dispersion in which core substance particles have been dispersed into a coacervate (thick phase) in which a polymer concentration is high and a thin phase).

(5) In-liquid drying method (method in which a wall membrane is formed by preparing a liquid obtained by dispersing the core substance in the solution of a wall membrane substance, adding the dispersion into a liquid in which the continuous phase in this dispersion is not mixed to make a complex emulsion and gradually removing a medium which has dissolved the wall membrane substance).

(6) Melting dispersion cooling method (method in which a wall membrane is formed by utilizing a wall membrane substance which dissolves into a liquid form by heating and solidifies at ambient temperature, heating/liquefying this substance, dispersing core substance particles therein, making them fine particles and cooling).

(7) In-air suspension coating method (method in which a wall membrane is formed by suspending core substance particles of powder in air by fluid bed, and spraying/mixing a coating solution of the wall membrane substance with suspending in air flow).

(8) Spray drying method (method in which a wall membrane is formed by spraying a capsulated neat solution, contacting this with hot wind and evaporating/drying a volatile portion).

(9) Acid out method (method in which the solubility in water is imparted by neutralizing at least a part of an anionic group of an organic polymer compound containing the anionic group with a basic compound, the resulting compound is kneaded together with the color material in an aqueous solvent, subsequently the mixture is made neutral or acid with an acidic compound to precipitate the organic compound, which is then fixed to the color material, and then the solution is neutralized and dispersed).

(10) Phase inversion emulsification method (method in which a mixture containing an anionic organic polymer having a dispersibility in water and the color material are made an organic solvent phase, water is placed in the organic solvent phase or the organic solvent phase is placed in water).

The organic polymers (resins) used as the material which constitutes the wall membrane substance of the microcapsule include, for example, polyamide, polyurethane, polyester, polyurea, epoxy resins, polycarbonate, urea resins, melamine resins, phenol resins, polysaccharides, gelatin, gum acacia, dextran, casein, proteins, natural gums, carboxypolymethylene, polyvinyl alcohol, polyvinyl pyrrolidone, polyvinyl acetate, polyvinyl chloride, polyvinylidene chloride, cellulose, ethylcellulose, methylcellulose, nitrocellulose, hydroxyethylcellulose, acetate cellulose, polyethylene, polystyrene, polymers or copolymers of (meth)acrylic acid, polymers or copolymers of (meth)acrylate ester, (meth)acrylic acid-(meth)acrylate ester copolymers, styrene-(meth)acrylic acid copolymers, styrene-maleic acid copolymers, sodium alginate, fatty acid, paraffin, bee wax, water wax, cured beef tallow, carnauba wax and albumin.

Among them, it is possible to use the organic polymers having the anionic group such as carboxylic acid group and sulfonic acid group. The nonionic organic polymers include, for example, polyvinyl alcohol, polyethylene glycol monomethacrylate, polypropylene glycol monomethacrylate, methoxy polyethylene glycol monomethacrylate or (co) polymers thereof, and cation ring opening polymers of 2-oxazoline. Among them, completely saponified polyvinyl alcohol is particularly preferable because its water-solubility is low and it is easily dissolved in hot water whereas hardly dissolved in cold water.

The amount of the organic polymers which constitute the wall membrane substance of the microcapsule is preferably 1% by mass or more and 20% by mass or less relative to the water-insoluble color material such as organic pigments and carbon black. By making the amount of the organic polymers in the above range, it becomes possible to inhibit the decrease in color developing property of the pigment, caused by coating the pigment surface with the organic polymers because the content rate of the organic polymers is relatively low in the capsule. When the amount of the organic polymers is less than 1%, the effect of capsulation is hardly elicited. Conversely, when it exceeds 20% by mass, the color developing property of the pigment is remarkably decreased.

Considering other properties, it is more preferable that the amount of the organic polymers is in the range of 5% by mass to 10% by mass relative to the amount of the water-insoluble color material.

Since a part of the color material is not coated and is exposed, it becomes possible to inhibit the decrease of the color developing property. Since the part of the color material is substantially coated without being exposed, it becomes possible to simultaneously elicit the effect of the coated pigment. The number average molecular weight of the organic polymers used in the present invention is preferably 2,000 or more in terms of production of the capsule. Here, "substantially exposed" means not a partial exposure subsequent to defect such as pinhole and crack but the state of being intentionally exposed.

If the organic pigment which is the self-dispersible pigment or the self-dispersible carbon black is used as the color material, the dispersibility of the pigment is enhanced even when the content of the organic polymers is relatively low in the capsule. Thus, it is more preferable for the present invention because it becomes possible to assure the sufficient storage stability of the ink.

It is preferable to select a suitable organic polymer depending on the method of microcapsulation. For example, in the case of interface polymerization, polyesters, polyamides, polyurethane, polyvinyl pyrrolidone and epoxy resins are suitable. In the case by in situ polymerization, polymers or copolymers of (meth)acrylic acid, (meth)acrylic acid-(meth) acrylate ester copolymers, styrene-(meth)acrylic acid copolymers, polyvinyl chloride, polyvinylidene chloride and polyamide are suitable. In the case of in-liquid curing, sodium alginate, polyvinyl alcohol, gelatin, albumin and epoxy resins are suitable. In the case of the coacervation method, gelatin, celluloses and casein are suitable. In order to obtain the fine and uniform microcapsulated pigment, it is possible, of course, to utilize all of the methods of microcapsulation that are known conventionally and publicly in addition to the above.

When the phase invasion method or the acid out method is selected as the method for microcapsulation, the anionic organic polymers are used as the organic polymers which constitute the wall membrane substance of the microcapsule. In the phase inversion method, a complex or a complex body of the anionic organic polymers having the self-dispersibility or solubility in water and the color material such as self-dispersible pigment or self-dispersible carbon black, or a mixture of the color material such as self-dispersible pigment or self-dispersible carbon black, the curing agent and the anionic organic polymers is made the organic solvent phase, the water is, placed in the organic solvent phase or the organic solvent phase is placed in the water to make microcapsules with self-dispersing (phase inversion emulsification). In the above phase inversion method, it is no problem to produce by mixing the vehicle or the additive for the recording liquid in the organic solvent phase. Particularly, in terms of being capable of directly producing the dispersion for the recording liquid, it is more preferable to mix the liquid solvent for the recording liquid.

Meanwhile, in the acid out method, a hydrous cake is obtained by the production method including a step of neutralizing some or all of the anionic groups in the anionic group-containing organic polymer with a basic compound and kneading it with a color material such as a self-dispersible pigment or self-dispersible carbon black in an aqueous solvent; and a step of making pH neutral or acidic with an acidic compound to precipitate the anionic group-containing organic polymers, which are then fixed onto the pigment, and the hydrous cake is microcapsulated by neutralizing some or all of the anionic groups using a basic compound. In this way, it is possible to produce the water-based dispersion containing the fine anionic microcapsulated pigment comprising the pigment abundantly.

The solvents used upon the above microcapsulation include, for example, alkyl alcohols such as methanol, ethanol, propanol and butanol; aromatic hydrocarbons such as benzole, toluol and xylol; esters such as methyl acetate, ethyl acetate and butyl acetate; chlorinated hydrocarbons such as chloroform and ethylene dichloride; ketones such as acetone and methyl isobutyl ketone; ethers such as tetrahydrofuran and dioxane; cellsolves such as methyl cellsolve and butyl cellsolve. The microcapsule prepared by the above method is once separated from these solvents by centrifugation or filtration, and this is stirred with water and the required solvent and the redispersion is performed to yield an ink of interest. The average particle diameter of the capsulated pigments obtained by the above method is preferably 50 nm to 180 nm.

The amount of the coloring agent to be added in the ink is preferably 6% by mass to 15% by mass and more preferably 8% by mass to 12% by mass. When the amount is less than 6% by mass, the image density is decreased due to reduce coloring power, and the feathering and the bleeding may more likely to occur due to decreased viscosity in some cases. When it exceeds 15% by mass, the nozzles are easily dried and a non ink-discharging phenomenon occurs when the recording apparatus is left stand, permeability is decreased due to the excessively high ink viscosity, image density is decreased due to non-spread dots, and resulting images becomes rough.

<Water-Soluble Organic Solvent>

As the water-soluble organic solvent, any of polyol compounds having 8 or more carbon atoms and glycol ether compounds is used.

When the polyol compound has less than 8 carbon atoms, sufficient permeability is not obtained, a recording media is stained upon both-side printing, and the letter quality and the image density are decreased because ink is not sufficiently spread on the recording media to insufficiently fill pixels in some cases.

As the polyol compounds having 8 or more carbon atoms, for example, 2-ethyl-1,3-hexanediol (solubility 4.2% at 25° C.), 2,2,4-trimethyl-1,3-pentanediol (solubility 2.0% at 25° C.) are suitable.

The amount of the water-soluble organic solvent to be added is preferably 1% by mass to 20% by mass and more preferably 0.5% by mass to 10% by mass.

Examples of the glycol ether compounds include polyhydric alcohol alkyl ether compounds and polyhydric alcohol aryl ether compounds.

Specific examples of the polyhydric alcohol alkyl ether compounds include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monomethyl ether.

Specific examples of the polyhydric alcohol aryl ether compounds include ethylene glycol monophenyl ether and ethylene glycol monobenzyl ether.

<Wetting Agent>

The wetting agent is not particularly limited, can be optionally selected depending on the purpose, and for example, at least one selected from polyol compounds, lactam compounds, urea compounds and saccharides is suitable.

The polyol compounds include, for example, polyvalent alcohols such as ethylene glycol, diethylene glycol, triethylene glycol, polyethylene glycol, polypropylene glycol, 1,3-propanediol, 1,3-butanediol, 1,4-butanediol, 3-methyl-1,3-butanediol, 1,5-pentanediol, 1,6-hexanediol, glycerine, 1,2,6-hexanetriol, 1,2,4-butanetriol, 1,2,3-butanetriol and petriol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether; polyvalent alcohol aryl ethers such as ethylene glycol monophenyl ether and ethylene glycol monobenzyl ether. These may be used alone or in combination of two or more.

Among them, in terms of obtaining the excellent effect on the prevention of spray property defect due to the solubility and the water evaporation, glycerine, ethylene glycol, diethylene glycol, triethylene glycol, tetraethylene glycol, polyethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,5-pentanediol, 1,6-hexanediol, 2-methyl-2,4-pentanediol, 1,2,4-butanetriol, 1,2,6-hexanetriol, thiodiglycol, pentaerythritol, trimethylolethane and trimethylolpropane are particularly preferable.

The lactam compounds include, for example, at least one selected from 2-pyrrolidone, N-methyl-2-pyrrolidone, N-hydroxyethyl-2-pyrrolidone and ε-caprolactam.

The urea compounds include, for example, at least one selected from urea, thiourea, ethylene urea and 1,3-dimethyl-2-imidazolidinone. The amount of the urea compound to be added in the ink is generally preferably 0.5% by mass to 50% by mass and more preferably 1% by mass to 20% by mass.

The saccharides include monosaccharides, disaccharides, oligosaccharides (including trisaccharides and tetrasaccharides), polysaccharides or derivatives thereof. Among them, glucose, mannose, fructose, ribose, xylose, arabinose, galactose, maltose, cellobiose, lactose, sucrose, trehalose and maltotriose are suitable, and maltitose, sorbitose, gluconolactone and maltose are particularly preferable.

The polysaccharides mean sugars in a broad sense and can be used to encompass sugars such as α-cyclodextrin and cellulose, which occur widely and abundantly in nature.

The derivatives of the saccharides include reducing sugars of the saccharides (e.g., sugar alcohols (represented by the general formula: $HOCH_2(CHOH)_nCH_2OH$, where n represents an integer of 2 to 5), oxidized sugars (e.g., aldonic acid, uronic acid), amino acids, and thioacid. Among them, sugar alcohols are particularly preferable. The sugar alcohols includes, for example, maltitol and sorbit.

The content of the wetting agent in the ink is preferably 10% by mass to 50% by mass and more preferably 15% by mass to 35% by mass.

When the content is too small, the nozzles are easily dried and the poor jetting of the liquid drop sometimes occurs. When the content is too large, the ink viscosity is increased and exceeds the proper viscosity range in some cases.

<Surfactants>

The surfactant is not particularly limited, can be optionally selected depending on the purpose, and includes, for example, anionic surfactants, nonionic surfactants, ampholytic surfactants, acetylene glycol-based surfactants and fluorine-based surfactants. In particular, at least one selected from the following general formulae (I), (II), (III), (IV), (V) and (VI) is preferable.

$R^1—O—(CH_2CH_2O)hCH_2COOM$  General Formula (I)

where $R^1$ represents an alkyl group; h represents an integer of 3 to 12; and M represents any one selected from alkali metal ion, quaternary ammonium, quaternary phosphonium and alkanolamine.

General Formula (II)

where, $R^2$ represents an alkyl group; and M represents any one selected from alkali metal ion, quaternary ammonium, quaternary phosphonium and alkanolamine.

General Formula (III)

$$R^3-\bigcirc-O(CH_2CH_2O)_kH$$

where $R^3$ represents a hydrocarbon group and k represents an integer of 5 to 20.

$$R^4-(OCH_2CH_2)_jOH \quad \text{General Formula (IV)}$$

where $R^4$ represents a hydrocarbon group and j represents an integer of 5 to 20.

General Formula (V)

$$H-(OCH_2CH_2)_L-(OCHCH_2)_p-R^6$$
$$\quad\quad\quad\quad\quad\quad\quad\quad\quad\quad |$$
$$\quad\quad\quad\quad\quad\quad\quad\quad\quad CH_3$$

where $R^5$ represents a hydrocarbon group, and L and p each represents an integers of 1 to 20.

(VI)

$$CH_3CHCH_2C-C\equiv C-CCH_2CHCH_3$$

(with CH$_3$ groups and $(CH_2CH_2O)_q H$ and $(CH_2CH_2O)_r H$ branches)

Where q and r each represents an integers of 0 to 40.

The surfactants represented by the above structural formulae (I) and (II) are shown specifically in free acid forms below.

(I-1):

$CH_3(CH_2)_{12}O(CH_2CH_2O)_3CH_2COOH$ (I-2):

$CH_3(CH_2)_{12}O(CH_2CH_2O)_4CH_2COOH$ (I-3):

$CH_3(CH_2)_{12}O(CH_2CH_2O)_5CH_2COOH$ (I-4):

$CH_3(CH_2)_{12}O(CH_2CH_2O)_6CH_2COOH$ (I-5):

$CH_3(CH_2)_{11}CHO(CH_2CH_2O)_6CH_2COOH$
$\quad\quad\quad\quad |$
$\quad\quad\quad\quad CH_3$ (I-6):

$CH_3(CH_2)_6CHO(CH_2CH_2O)_3CH_2COOH$
$\quad\quad\quad\quad |$
$\quad\quad\quad\quad (CH_2)_5CH_3$ (II-1):

$$\begin{array}{c} CH_3 \quad\; CH_3 \\ | \quad\quad\; | \\ CH_2COOCHCH_2CHCH_3 \\ | \\ HO_3S-CHCOOCHCH_2CHCH_3 \\ | \quad\quad\; | \\ CH_3 \quad\; CH_3 \end{array}$$

(II-2):

$$\begin{array}{c} CH_3 \\ | \\ CH_2COOCHCH_2CH_2CH_3 \\ | \\ HO_3S-CHCOOCHCH_2CH_2CH_3 \\ | \\ CH_3 \end{array}$$

(II-3):

$$\begin{array}{c} CH(CH_3)_2 \\ | \\ CH_2COOCHCH(CH_3)_2 \\ | \\ HO_3S-CHCOOCHCH(CH_3)_2 \\ | \\ CH(CH_3)_2 \end{array}$$

(II-4):

$$\begin{array}{c} CH_2COOCH_2CH_2CH(CH_3)_2 \\ | \\ HO_3S-CHCOOCH_2CH_2CH(CH_3)_2 \end{array}$$

The anionic surfactants include, for example, polyoxyethylene alkyl ether acetate salts, dodecyl benzene sulfonate salts, laurate salts and polyoxyethylene alkyl ether sulfate salts.

The nonionic surfactants include, for example, polyoxyethylene alkyl ether, polyoxypropylene polyoxyethylene alkyl ether, polyoxyethylene alkyl ester, polyoxyethylene sorbitan fatty acid ester, polyoxyethylene alkyl phenyl ether, polyoxyethylene alkyl amine and polyoxyethylene alkyl amide.

The ampholytic surfactants include, for example, laurylamino propionate salts, lauryldimethylbetaine, stearyldimethylbetaine and lauryldihydroxyethylbetaine. Specifically, lauryldimethylamine oxide, myristyldimethylamine oxide, stearyldimethylamine oxide, dihydroxyethyllaurylamine oxide, polyoxyethylene palm oil alkyldimethylamine oxide, dimethylalkyl(palm)betaine and dimethyllaurylbetaine.

As the acetylene glycol-based surfactants, for example, acetylene glycol-based ones such as 2,4,7,9-tetramethyl-5-decine-4,7-diol, 3,6-dimethyl-4-octine-3,6-diol, 3,5-dimethyl-2-hexine-3-ol (e.g., Surfynol 104, 82, 465, 485 or TG supplied from Air Products (USA)) can be used.

As the fluorine-based surfactants, ones represented by the following general formula (II-5) are suitable.

$$CF_3CF_2(CF_2CF_2)_m-CH_2CH_2O(CH_2CH_2O)_nH \quad\quad (II-5)$$

where m represents an integer of 0 to 10 and n represents an integer of 1 to 40.

The fluorine-based surfactants include, for example, perfluoroalkyl sulfonate salts, perfluoroalkyl carboxylate salts, perfluoroalkyl phosphate ester, perfluoroalkyl ethylene oxide adducts, perfluoroalkyl betaine and perfluoroalkyl amine oxide compounds.

The commercially available fluorine-based surfactants include, for example, Surflon S-111, S-112, S-113, S121, S131, S132, S-141, S-145 (supplied from Asahi Glass Co., Ltd.); Fullard FC-93, FC-95, FC-98, FC-129, FC-135, FC-170C, FC-430, FC-431, FC-4430 (supplied from Sumitomo 3M Ltd.); Megafac F-470, F-140, F-474 (supplied from Dainippon Ink And Chemicals, Incorporated); Zonil FS-300, FSN, FSN-100, FSO (supplied from DuPont); and F-Top EF-351, 352, 801, 802 (supplied from JECOM). Among them, Zonil FS-300, FSN, FSN-100, FSO (supplied from DuPont), which are particularly good for reliability and enhanced color development, can be suitably used.

<Color Material Fixing Agent>

As the color material fixing agent, optional resin emulsions and ultraviolet light curable resins can be used.

The resin emulsion is obtained by dispersing resin fine particles in water as the continuous phase, and may contain a dispersant such as a surfactant if necessary.

The content (content of the resin fine particles in the resin emulsion) of the resin fine particles as a dispersion phase ingredient is generally preferably 10% by mass to 70% by mass. The average particle diameter of the resin fine particles is preferably 10 nm to 1000 nm and more preferably 20 nm to 300 nm, particularly considering the use for the inkjet recording apparatus.

The resin fine particle ingredient in the dispersion phase is not particularly limited, can be optionally selected depending on the purpose, and includes, for example, acrylic resins, vinyl acetate-based resins, styrene-based resins, butadiene-based resins, styrene-butadiene-based resins, vinyl chloride-based resins, acrylstyrene-based resins and acryl silicone-based resins. Among them, the acryl silicone-based resin is particularly preferable.

As the resin emulsion, those optionally synthesized or commercially available ones may be used.

The commercially available resin emulsions include, for example, Microgel E-1002, E-5002 (styrene-acrylic resin emulsions, supplied from Nippon Paint Co., Ltd.); Boncoat 4001 (acrylic resin emulsion, supplied from Dainippon Ink And Chemicals, Incorporated); Boncoat 5454 (styrene-acrylic resin emulsions, supplied from Dainippon Ink And Chemicals, Incorporated); SAE-1014 (styrene-acrylic resin emulsions, supplied from Zeon Corporation); Saibinol SK-200 (acrylic resin emulsion, supplied from Saiden Chemical Industry Co., Ltd.); Primal AC-22, AC-61 (acrylic resin emulsion, supplied from Rohm and Haas); Nanocril SBCX-2821, 3689 (acryl silicone-based emulsion, supplied from Toyo Ink MFG Co., Ltd.); and #3070 (methyl methacrylate polymer resin emulsion, supplied from Mikuni Color Ltd.).

The amount of the resin fine particles added in the resin emulsion is preferably 0.1% by mass to 50% by mass, more preferably 0.5% by mass to 20% by mass and still more preferably 1% by mass to 10% by mass in the ink. When the amount is less than 0.1% by mass, anti-clogging effect and jetting stability are not sufficiently enhanced in some cases. When it exceeds 50% by mass, the storage stability of the ink is sometimes deceased.

Specific examples of the ultraviolet light curable resin can include those obtained by polymerizing acrylic photopolymerizable monomers or acrylic photopolymerizable oligomers.

As the acrylic photopolymerizable monomers, unsaturated carboxylic acids such as acrylic acid and methacrylic acid and esters thereof include, for example, alkyl acrylate, cycloalkyl acrylate, halogenated alkyl(meth)acrylate, alkoxyalkyl (meth)acrylate, hydroxyalkyl(meth)acrylate, aminoalkyl (meth)acrylate, tetrahydrofrufryl(meth)acrylate, allyl(meth) acrylate, glycidyl (meth)acrylate, benzyl(meth)acrylate, phenoxy(meth)acrylate, mono- or di-(meth)acrylate of alkylene glycol, polyoxyalkylene glycol, trimethylolpropane tri (meth)acrylate and pentaerythrit tetra(meth)acrylate.

Acrylamide, methacrylamide and derivatives thereof include, for example, (meth)acrylamide, diacetone (meth) acrylamide, and N,N'-alkylene bis-(meth)acrylamide mono-substituted or disubstituted with alkyl or hydroxyalkyl group.

The ally compounds include, for example, allyl alcohol, allyl isocyanate, diallyl phthalate and triallyl isocyanurate.

Also, isobornyl(meth)acrylate, norbornyl(meth)acrylate, dicyclopentenoxyethyl(meth)acrylate and dicyclopentenoxypropyl (meth)acrylate are included.

(Meth)acrylate ester of diethylene glycol dicyclopentenyl monoether and (meth)acrylate ester of polyoxyethylene or polypropylene glycol dicyclopentenyl monoether are also included.

Dicyclopentenyl cinnamate, dicyclopentenoxyethyl cinnamate, dicyclopentenoxyethyl monofumarate or difumarate are also included.

Also, mono(meth)acrylate or di(meth)acrylate of 3,9-bis (1,1-bismethyl-2-oxyethyl)-spiro[5,5]undecane, 3,9-bis(1,1-bismethyl-2-oxyethyl)-2,4,8,10-tetraoxaspiro[5,5]undecane and 3,9-bis(2-oxyethyl)-spiro[5,5]undecane, or mono(meth) acrylate of ethylene oxide or propylene oxide addition polymers of spiro glycol thereof, or methyl ether of mono(meth) acrylate, 1-azabicyclo[2,2,2]-3-octenyl(meth)acrylate and bicyclo[2,2,1]-5-heptene-2,2-dicarboxymonoallyl ester are included.

Also, dichloropentadienyl(meth)acrylate, dicyclopentadienyloxyethyl(meth)acrylate and dihydrodicyclopentadienyl (meth)acrylate are included.

These photopolymerizable monomers may be used alone or in combination of two or more.

As the acrylic photopolymerizable oligomers, acrylate esters of epoxy resins include, for example, diglycidyl diether diacrylate of bisphenol A, reaction products of epoxy resin, acrylic acid and methyltetrahydrophthalic acid anhydrate, reaction products of epoxy resin and 2-hydroxyethyl acrylate and ring opening copolymer esters of glycidyl diacrylate and phthalic acid anhydrate.

Also, unsaturated polyester-based prepolymers such as esters of methacrylic acid dimer and polyol, polyesters obtained from propylene oxide of acrylic acid and phthalic acid anhydrate, reaction products of polyvinyl alcohol and N-methylol acrylamide, reaction products of polyethylene glycol, maleic acid anhydrate and glycidyl methacrylate are included.

Also, polyvinyl alcohol-based prepolymers such as those obtained by esterifying polyvinyl alcohol with succinic acid anhydrate and subsequently adding glycidyl methacrylate, polyacrylic acid or maleic acid copolymer-based prepolymers such as reaction products of methylvinyl ether-maleic acid anhydrate copolymer and 2-hydroxyethyl acrylate or those obtained by further reacting glycidyl methacrylate therewith are included.

Additionally, urethane-based prepolymers linking a polyoxyalkylene segment or a saturated polyester segment or both thereof through urethane bond and having acryloyl group or methacryloyl group at both ends can be included.

<Other Ingredients>

The other ingredients are not particularly limited, can be optionally selected as needed, and include, for example, pH adjusters, preservatives and anti-fungus agents, antirust agents, antioxidants, ultraviolet light absorbers, oxygen absorbers and light stabilizers.

The preservatives and anti-fungus agents include, for example, 1,2-benzisothiazoline-3-one, sodium dehydroacetate, sodium sorbate, sodium 2-pyridinethiol-1-oxide, sodium benzoate and sodium pentachlorophenol.

The pH adjusters are not particularly limited as long as pH can be adjusted to 7 or more without adversely affecting the prepared ink, and can be optionally selected depending on the purpose. The pH adjusters include, for example, amine such as diethanolamine and triethanolamine, hydroxide of alkali metal elements such as lithium hydroxide, sodium hydroxide and potassium hydroxide, hydroxide of quaternary ammonium, hydroxide of quaternary phosphonium, carbonate salts of alkali metals such as lithium carbonate, sodium carbonate and potassium carbonate.

The antirust agents include, for example, acidic sulfite salts, sodium thiosulfate, ammonium thioglycolate, diisopropylammonium nitrate, pentaerythritol tetranitrate and cyclohexylammonium nitrate.

The antioxidants include, for example, phenol-based antioxidants (including hindered phenol-based ones), amine-based antioxidants, sulfur-based antioxidants and phosphorous-based antioxidants.

The phenol-based antioxidants (including hindered phenol-based antioxidants) include, for example, butylated hydroxyanisole, 2,6-di-tert-butyl-4-ethylphenol, stearyl-β-(3,5-di-tert-butyl-4-hydroxyohenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetraixaspiro[5,5]undecane, 1,1,3-tris(2-methyl-4-hydroxy-5-tert-butylphenyl(butane, 1,3,5-trimethyl-2,4,6-tris(3,5-di-tert-butyl-4-hydroxybenzyl)benzene and tetraxis[methylene-3-(3',5'-di-tert-butyl-4'-hydroxyphenyl)propionate]methane.

The amine-based antioxidants include, for example, phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetraxis[methylene-3-(3,5-di-tert-butyl-4-dihydrophenyl)propionate]methane and 1,1,3-tris(2-methyl-4-hydroxy-5-tert-butylphenyl) butane.

The sulfur-based antioxidants include, for example, dilauryl-3,3'-thiodipropionate, distearyl thiodipropionate, lauryl stearyl thiodipropionate, dimyristyl-3,3'-thiodipropionate, distearyl β,β'-thiodipropionate, 2-mercaptobemzimidazole and dilauryl sulfide.

The phosphorous-based antioxidants include, for example, triphenyl phosphite, octadecyl phosphite, triisodecyl phosphite, trilauryl trithiophosphite and trinonylphenyl phosphite.

The ultraviolet light absorbers include, for example, benzophenone-based ultraviolet light absorbers, benzotriazole-based ultraviolet light absorbers, salicylate-based ultraviolet light absorbers, cyanoacrylate-based ultraviolet light absorbers and nickel complex salt-based ultraviolet light absorbers.

The benzophenone-based ultraviolet light absorbers include, for example, 2-hydroxy-4-n-octoxybenzophenone, 2-hydroxy-4-n-dodecyloxybenzophenone, 2,4-dihydroxy-benzophenone, 2-hydroxy-4-methoxybenzophenone and 2,2',4,4'-tetrahydroxybenzophenone.

The benzotriazole-based ultraviolet light absorbers include, for example, 2-(2'-hydroxy-5-tert-octylphenyl)benzotriazole, 2-(2'-hydroxy-5'-methylphenyl)benzotriazole, 2-(2'-hydroxy-5'-octoxyphenyl)benzotriazole and 2-(2'-hydroxy-3-tert-butyl-5'-methylphenyl)-5-chlorobenzotriazole.

The salicylate-based ultraviolet light absorbers include, for example, phenyl salicylate, p-tert-butylphenyl salicylate and p-octylphenyl salicylate.

The cyanoacrylate-based ultraviolet light absorbers include, for example, ethyl-2-cyano-3,3'-diphenyl acrylate, methyl-2-cyano-3-methyl-3-(p-methoxyphenyl)acrylate and butyl-2-cyano-3-methyl-3-methoxyphenyl)acrylate.

The nickel complex salt-based ultraviolet light absorbers include, for example, nickel bis(octylphenyl)sulfide, 2,2'-thiobis(4-tert-octylphelate)-n-butylamine nickel (II), 2,2'-thiobis(4-tert-octylphelate)-2-ethylhexylamine nickel (II) and 2,2'-thiobis(4-tert-octylphelate)triethanolamine nickel (II).

The ink of the present invention is produced by dispersing or dissolving at least water, the coloring agent and the water-soluble organic solvent, the wetting agent, the surfactant, further the other ingredients in the water-based solvent as needed, and further stirring and mixing as needed. The dispersion can be performed, for example, using a sand mill, a homogenizer, a ball mill, a paint shaker and an ultrasonic dispersing machine. The stirring/mixing can be performed using a usual stirrer equipped with a stirring blade, a magnetic stirrer or a high-speed dispersing machine.

With respect to the physical properties of the ink, for example, it is preferable that the viscosity, the surface tension and pH are in the following ranges.

The viscosity is preferably 5 cps or more and more preferably 8 to 20 cps at 25° C. When the viscosity is more than 20 cps, it becomes difficult to assure the jetting stability in some cases. In the light of the current head performance, the viscosity of 17 to 20 cps is the upper limit, and actually at this viscosity it has been confirmed that the image quality on the coating paper is good. When the viscosity becomes higher than this, it sometimes becomes difficult to make the image.

The surface tension is necessary to be 25 mN/m or less and is preferably 20 mN/m to 25 mN/m. When the surface tension is less than 20 mN/m, ink bleeding becomes remarkable on a recording media, and the stable jetting of the ink is not sometimes obtained. When it exceeds 26 mN/m, the ink is not sufficiently permeated into the recording media, resulting in the occurrence of beading and in prolonged drying time.

The pH value is preferably, for example 7 to 10.

Coloration of the ink is not particularly limited, can be optionally selected depending on the purpose, and includes yellow, magenta, cyan and black coloration. The use of an ink set combining two or more of these colors for recording produces multiple color images. The use of an ink set combining all of these colors for recording produces full color images.

<Polishing Means and Polishing Step>

The barrier layer of the present invention can be provided by coating as mentioned above. However, as a result of the extensive study by the present inventors, it has been found that the barrier layer of the present invention is made by polishing the surface of the existing coated paper for printing. This is speculated to be because the film thickness of the coating layer is reduced to the level exhibited in this patent application by polishing, and pores appear from the resin layer unevenly distributed on the outermost surface, resulting in acquiring the function as the barrier layer.

The existing coated paper for the printing refers to coated paper such as so-called art papers (A0, A), A2 coating papers, A3 coating papers, B2 coating papers, light coating papers and fine coated papers used for the commercial printing, and is used for the offset, printing and the gravure printing.

As specific commercial products, the art papers include, OK Kanefuji N, OK Kanefuji-R40N, SA Kanefuji N, Satin Kanefuji N, Satin Kanefuji-R40N, Ultrasatin Kanefuji N, Ultra OK Kanefuji N and Kanefuji one side (supplied from Oji Paper Co., Ltd.); NPi Special Art, NPi Super Art, NPi Super Dull and NPi Dull Art (supplied from Nippon Paper Industries Co., Ltd.); Utrillo Super Art, Utrillo Supper Dull and Utrillo Super Premium (supplied from Daio Paper Corporation); high quality Art A, Tokuhishi Art, Super Mat Art A, High-Quality Dull Art A (supplied from Mitsubishi Paper Mills Limited); Raicho Super Art N, Raicho Super Art MN, Raicho special Art and Raicho Dull Art N (supplied from Chuetsu Pulp & Paper Co., Ltd.).

The A2 coating papers include OK Top Coat+(Plus), OK Top Coat S, OK Casablanca, OK Casablanca V, OK Trinity, OK Trinity NaVi, New Age, New Age W, OK TOP Coat Mat N, OK Royal Coat, OK Top Coat Dull, Z Coat, OK Kasahime, OK Kasao, OK Kasao Satin, OK Top Coat+, OK Nonwrinkle, OK Coat V, OK Coat N Green, OK Mat Coat Green 100, New Age Green 100 and Z Coat Green 100 (supplied from Oji Paper Co., Ltd.); Aurora Coat, Shiraoi mat, Imperial Mat, Silver Diamond, Recycle Coat 100 and Cycle Mat 100 (supplied from Nippon Paper Industries Co., Ltd.); Mu Coat, Mu White, Mu Mat, White Mu Mat (supplied from Hokuetsu Paper Mills, Ltd.); Raicho Coat, Regina Raicho Coat 100, Raicho Mat Coat N, Regina Raicho Mat 100 (supplied from Chuetsu Pulp & Paper Co., Ltd.); Pearl Coat, White Pearl Coat, New V Mat, White New V Mat, Pearl Coat REW, White Pearl Coat NREW, New V Mat REW and White New V Mat REW (supplied from Mitsubishi Paper Mills Limited).

The A3 coating (light coating) papers include OK Coat L, Royal Coat L, OK coat LR, OK White L, OK Royal Coat LR, OK Coat L Green, OK Mat Coat L100, Aurora L, Recycle Mat L100, <SSS> Energy White (supplied from Nippon Paper Industries Co., Ltd.); Utrillo Coat L, Matthies Coat (supplied from Daio Paper Corporation); Hi Alpha, Alpha Mat, (N) Kinmari L, Kinmari HiL (supplied from Hokuetsu Paper Mills, Ltd.); N Pearl Coat, N Pearl Coat LREW, Swing Mat REW (supplied from Mitsubishi Paper Mills Limited); Super Emine, Emine, Chaton (supplied from, Chuetsu Pulp & Paper Co., Ltd.).

The B2 coating papers (medium quality papers) include OK medium quality Coat, (F)MCOP, OK Astro Gloss, OK Astro Dull and OK Astro Mat (supplied from Oji Paper Co., Ltd.); and King 0 (supplied from Nippon Paper Industries Co., Ltd.).

The fine coating papers include OK Royal Light S Green, OK Ever Light Coat, OK ever light R, OK Ever Green, Clean Hit MG, OK fine coating Super Eco G, Eco Green Dull, OK fine coating mat Eco G100, OK Star Light Coat, OK Soft Royal, OK Bright, Green Hit G, Yamayuri Bright, Yamayuri Bright G, OK Aqua Light Coat, OK Royal Light S Green 100, OK Bright (rough, gloss), Snow Mat, Snow mat DX, OK Kasahime, OK Kasayuri (supplied from Oji Paper Co., Ltd.); Pyrene DX, Pegasus Hyper 8, Aurora S, Andes DX, Super Andes DX, Space DX, Seine DX, special Gravure DX, Pegasus, Silver Pegasus, Pegasus Harmony, Greenland DX 100, Super Greenland DX100, <SSS> Energy Soft, <SSS> Energy Light, EE Henry (supplied from Nippon Paper Industries Co., Ltd.); Kant Excel, Excel Super B, Excel Super C, Kant Excelbal, Utrillo Excel, Heyne Excel, Dante Excel (supplied from Daio Paper Corporation); Cosmo Ace (supplied from Nippon Daishowa Paperboard Co., Ltd.); Semi-Jo L, Hi Beta, Hi Gamma, Shiromari L, Hamming, White Hamming, Semi-Jo HiL, Shiromari HiL (supplied from Hokuetsu Paper Mills, Ltd.); Ruby light HREW, Pearl Soft, Ruby Light H (supplied from Mitsubishi Paper Mills Limited); Chaton, Ariso, Smash (supplied from Chuetsu Pulp & Paper Co., Ltd.); and Star Cherry, Super Cherry (supplied from Marusumi Paper Co., Ltd.)

As so-called coating layer formulation of the sheet for the popular commercial printing, those where binder (resin, emulsion, starch, etc.) is formulated at about 10 to 15 parts per 100 parts of the inorganic pigment (kaolin, calcium carbonate) are frequently observed in the literature. Here, discussing how the pigment exists in the coating layer, more specifically the concentration gradient of the pigment in the coating layer, there would be two possibilities: (1) a clear layer or the like formed on the outermost surface of a coating film, observed in the case of so-called coatings; and (2) an asymmetrical concentration distribution may be formed between the upper and lower layers due to the binder ingredient permeated into the base paper. However, concerning (1), only few discussion is seen when references in this field (references for gloss of the coated paper) are surveyed. It is speculated that the clear layer is hardly formed probably because the ratio of the combined resin is relatively low compared with popular coatings and resin is not added to an extent that the resin precipitates on the surface.

When technically discussed with technical workers who engaged with the production of the commercial coated papers, many of them had a technical concept to give the strength to an extent that the layer is not peeled off upon printing or powder omission does not occur upon cutting to the binder function. Probably because when the resin amount is increased, the coating production is troubled, and in the case of the paper of this type, some workers appeared to think that the binder is added at a minimum amount required.

Concerning the above (2), there seems to be a phenomenon that the resin proportion in the coating layer is actually lowered (than the composition of the coating solution) and the resin forms a layer at the interface between the coating layer and the base paper in the process that the resin in the coating solution is permeated into the base paper. However, no example (no reference) in which the layer itself has the gradient is confirmed. The resin-rich layer can be formed at the interface between the coating layer and the base paper, and in this case, it is predicted that the resin concentration is higher in the lower layer.

The method of polishing the outmost surface layer of these coating papers includes, but not limited to, the method of polishing using sand paper or wrapping paper, the method of polishing with a wire brush, the method of polishing using a polishing roller or an endless polishing belt, and the method of polishing using sand blast.

The polishing processing may be performed by providing the polishing step immediately after the drying, before and after the calendar treatment or after a slip step or a packing step which are the steps after the applying step, or alternatively, the user may polish using a polishing apparatus before the printing. It is also possible to incorporate the polishing apparatus and polish every printing.

The entire surface of the sheet may be polished, but only the region desired to be printed can be selectively polished.

For example, the offset printing or the gravure printing is previously performed on the popular print sheet described above, only the region required for the inkjet printing can be polished, and that region can be printed.

In accordance with this method, hybrid printing conventionally performed using the sheet capable of being used for both the inkjet printing and popular printing can be performed using the popular print sheet described above, and it becomes possible that the sheet share the uses for the popular printing and the inkjet printing. In accordance with this method, it becomes possible to print addresses by the inkjet printing, which has been considered to be difficult in the popular printing.

The polishing apparatus may be incorporated in the printer unit, but may be independently prepared as another unit.

As the special coating paper, if it fulfills the condition of the present invention, it can be substituted as the media of the present invention. Particularly, those having a high air permeability of the coating layer itself can be utilized. Those having the high air permeability include coating papers for some electrographs and coating papers for the gravure printing. Specifically POD Gloss Coat (Oji Paper Co., Ltd.), FL Gravure (Nippon Paper Industries Co., Ltd.) and Ace (Nippon Paper Industries Co., Ltd.) are included. These have many pores in the coating layer, and can be diverted as the media having the barrier layer of the present invention.

The ink in the ink media set of the present invention can be suitably used for the printer equipped with any inkjet head such as a so-called piezoelectric type inkjet head, where the volume of an ink flow path is changed to jet an ink drop by deforming a vibration plate which forms a wall of the ink flow path using a piezoelectric element as a pressure generating means to apply the pressure to the ink in the ink flow path (see JP-A No. 02-51734), or a so-called thermal inkjet head where bubbles are generated by heating ink in an ink flow path using an exothermic resistive element (see JP-A No. 61-599111), or an electrostatic inkjet head where an electrode and a vibration plate which forms the wall of an ink flow path are disposed in opposed positions, and the volume in the ink flow path is changed to jet ink by an electrostatic power generated between the electrode and the vibration plate (see JP-A No. 06-71882).

As described above, the above recording media is used by combining with the above ink. The combination of the recording media with the ink can be suitably used in various fields, can be suitably used in the image recording apparatus by the inkjet recording system, and for example, can be particularly suitably used for the following ink cartridge, ink recorded matter, inkjet recording apparatus and inkjet recording method.

<Ink Cartridge>

The ink cartridge of the present invention houses the ink in the ink media set of the present invention into a container, and further has other members optionally selected as needed.

The container is not particularly limited, a shape, a structure, a size and a material thereof are optionally selected depending on the purpose, and suitably includes, for example, those having at least an ink bag formed from an aluminium laminate film or a resin film.

Subsequently, the ink cartridge will be described with reference to FIGS. 1 and 2. Here, FIG. 1 shows one example of the ink cartridge of the present invention, and FIG. 2 shows the ink cartridge, including a case (outer package).

Figure 2:
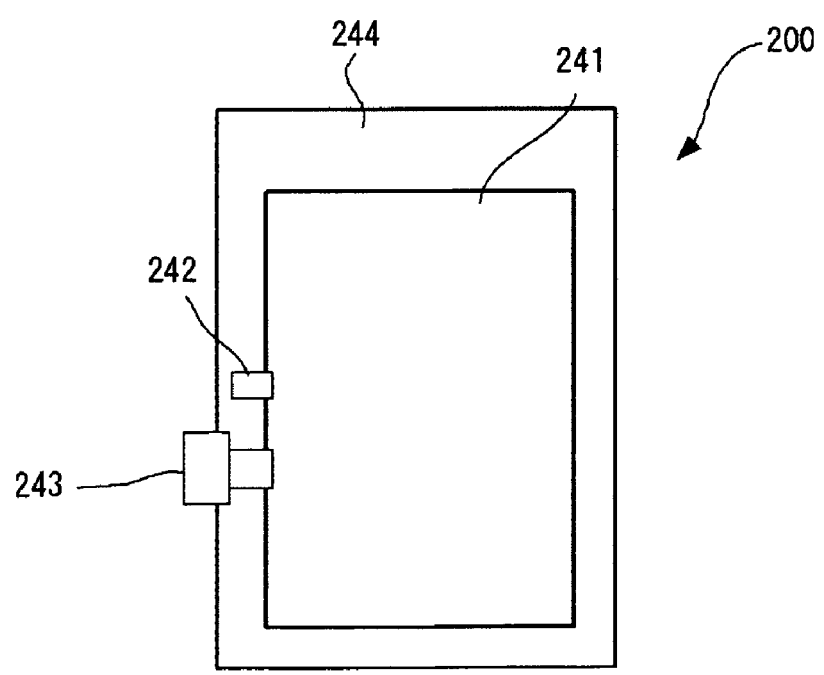
FIG. 2 is a schematic view the ink cartridge in FIG. 1, including a case (outer package).

As shown in FIG. 1, in the ink cartridge 200, an ink bag 241 is filled with ink from an ink inlet 242, and after deaerating, the ink inlet 242 is closed by fusion bond. In actual use, the ink is supplied by pushing a needle of an apparatus main body into an ink outlet 243 composed of a rubber member.

The ink bag 241 is formed from a packing member such as aluminium laminate film having no air permeability. As shown in FIG. 2, this ink bag 241 is typically housed in a cartridge case 244 made of plastic, and detachably mounted to various inkjet recording apparatuses for use.

The ink cartridge of the present invention houses the ink and can be mounted to various inkjet recording apparatuses for use. It is particularly preferable to mount it to the inkjet recording apparatus of the present invention described later.

Figure 3:
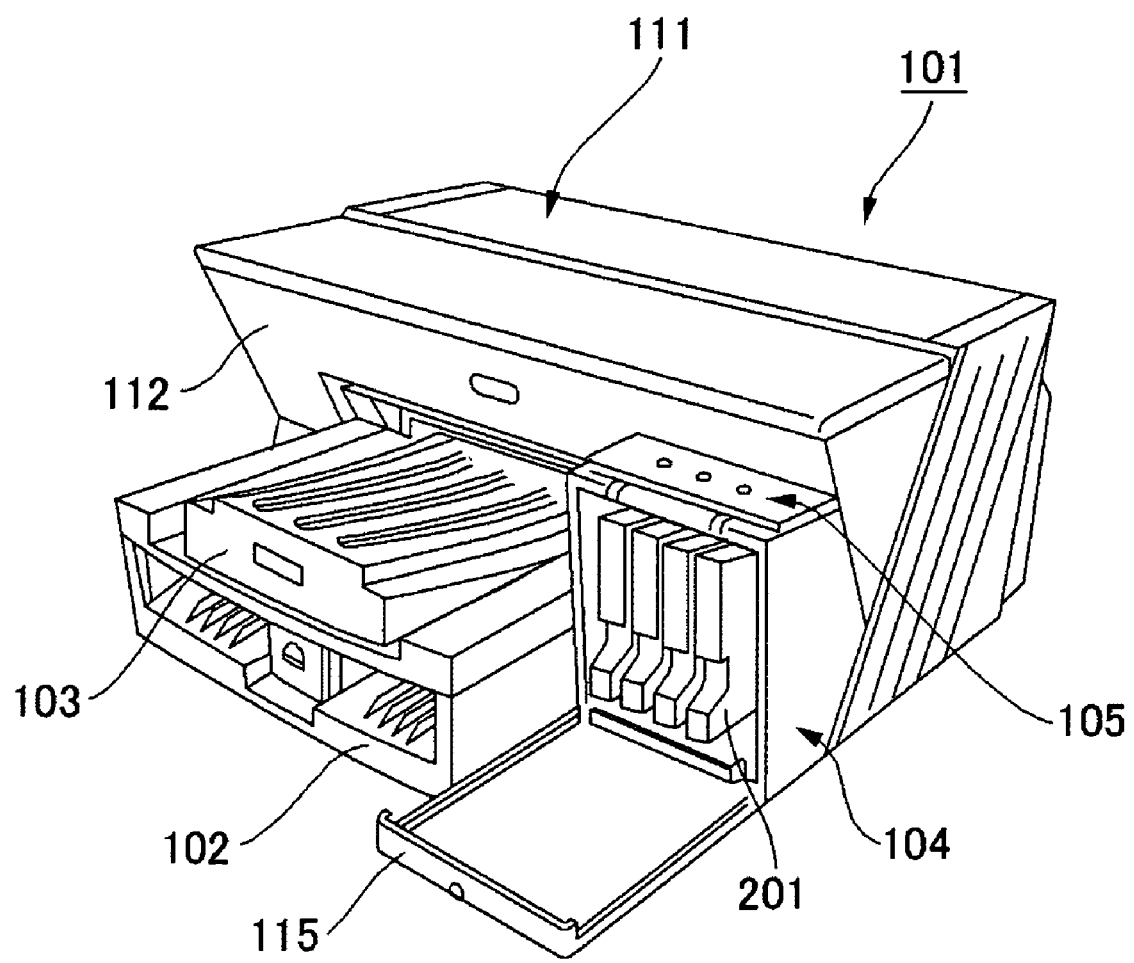
FIG. 3 is a perspective illustrative view showing an ink cartridge loading section with an opened caver of an inkjet recording apparatus.

One embodiment for carrying out the inkjet recording method of the present invention using the inkjet recording apparatus of the present invention will be described with reference to the drawings. The inkjet recording apparatus shown in FIG. 3 has an apparatus main body 101, a paper supply tray 102 for feeding paper sheets loaded to the apparatus main body 101, a paper discharge tray 103 which stocks paper sheets on which an image has been recorded (formed) and which is mounted to the apparatus main body 101, and an ink cartridge loading section 104. In FIG. 3, 111 represents an upper cover and 112 represents a front face.

An operation section 105 provided with operation keys, a display, etc., is disposed on the ink cartridge loading section 104. The ink cartridge loading section 104 has an openable and closable front cover 115 for detaching an ink cartridge 201.

Figure 4:
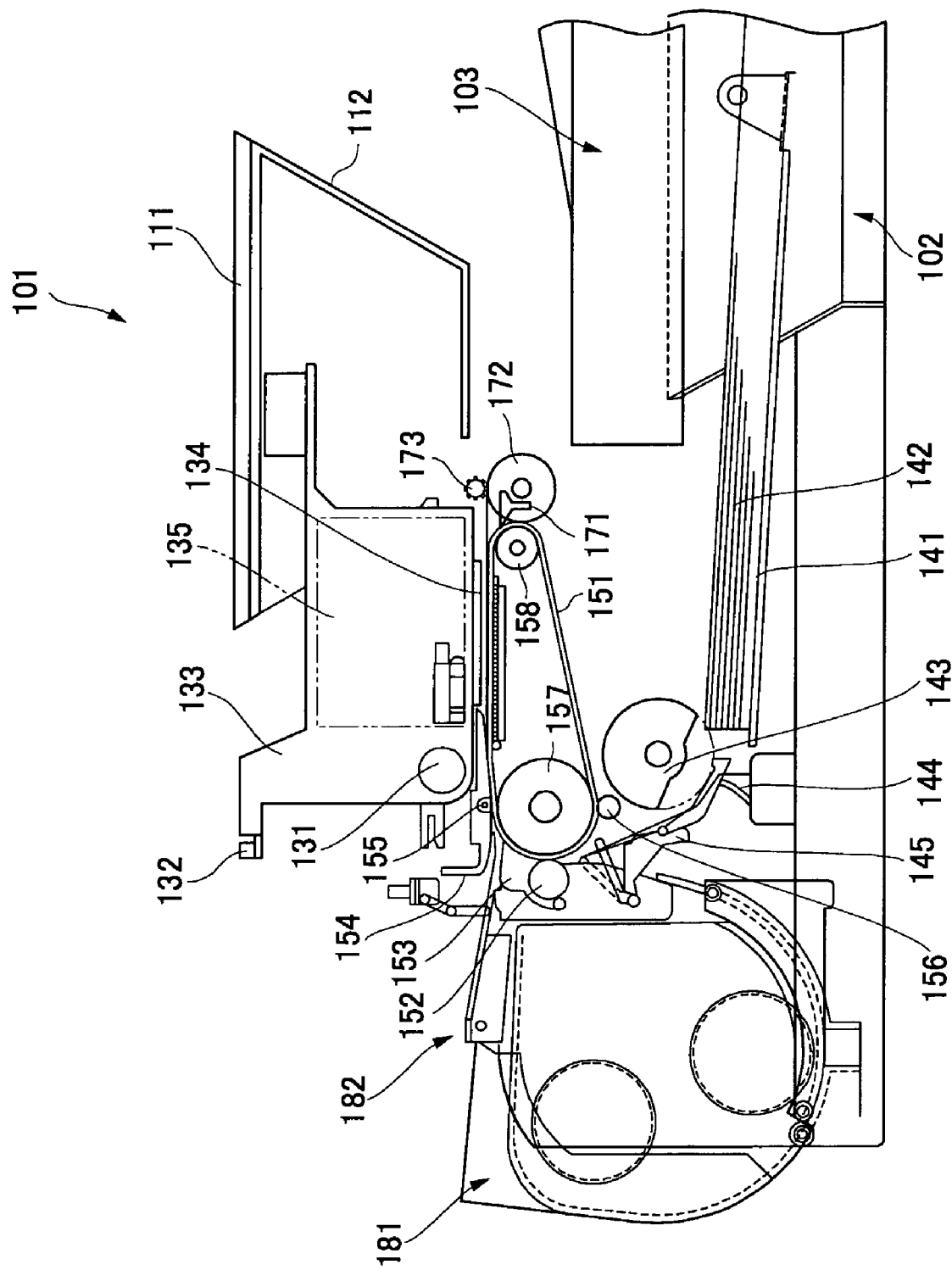
FIG. 4 is a schematic configuration diagram illustrating an entire configuration of the inkjet recording apparatus.
Figure 5:
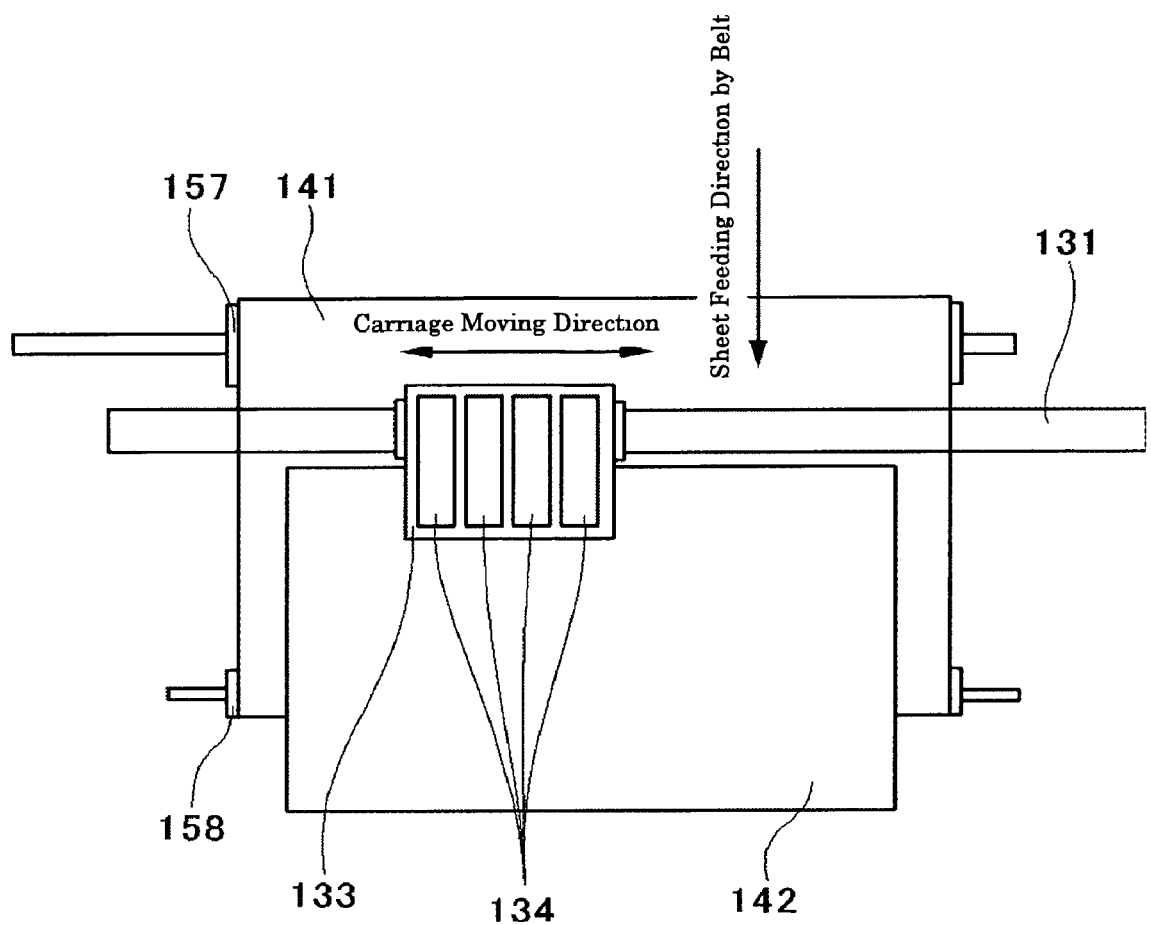
FIG. 5 is a schematic enlarged view showing one example of an inkjet head of the present invention.

As shown in FIGS. 4 and 5, a carriage 133 is retained by a guide rod 131, a guide member bridged between unillustrated right and left side plates, and a stay 132 so as to be slidable in a main scanning direction, and is moved by a main scanning motor (not shown) in the arrow direction in FIG. 5.

In the carriage 133, a recording head (134) composed of four heads for inkjet recording which jet ink drops for recording of respective colors such as yellow (Y), cyan (C), magenta (M) and black (B) is loaded so that multiple ink jetting openings are arranged in a direction which intersects the main scanning direction and an ink jetting direction is directed downward.

As the heat for inkjet recording which constitutes the recording head 134, it is possible to use those comprising the piezoelectric actuator such as a piezoelectric element, thermal actuator utilizing phase change by membrane boiling of the liquid using the electric thermal conversion element such as an exothermal resistive element, the shape memory alloy actuator using a metallic phase change by thermal change and the electrostatic actuator using the electrostatic power, as the energy generation means to jet the ink for recording.

The carriage 133 carries a subtank 135 for each color to supply each color ink to the recording head 134. The ink in the ink media set of the present invention is supplied from an ink cartridge (201) of the present invention loaded in the ink cartridge loading section 104 to the subtank 135 through the supplying tube for the ink for recording not shown in the figure.

Meanwhile, a paper supply section which supplies paper sheets 142 taken on a paper taking on section (pressure plate) 141 of the paper supply tray 103 comprises a half moon-type roller (paper supply roller 143) which separates and feeds the paper sheets one by one from the paper taking on section 141 and a separation pad 144 opposed to the paper supply roller 143 and composed of the material with large friction coefficient, and this separation pad 144 is biased toward the paper supply roller 143 side.

A feeding section for feeding the paper supplied from this paper supply section beneath the recording head 134 comprises a feeding belt 151 for feeding the paper 142 by absorbing electrostatically, a counter roller 152 for feeding the paper 142 sent through a guide 145 from the paper supply section by sandwiching with the feeding belt 151, a feeding guide 153 for feeding the paper sent in a nearly vertical upward direction on the feeding belt 151 by changing the direction of the paper at about 90°, and a tip pressurizing roller 155 biased to the feeding belt 151 side with a pushing member 154. An electrical charged roller 156 which is an electrical charge mean to charge the surface of the feeding belt 151 is also comprised.

The feeding belt is an endless belt, is disposed between a feeding roller 157 and a tension roller 158, and is capable of going around in a belt feeding direction. This feeding belt 151 has a surface layer which is a paper absorbing surface formed from, for example a resin material with a thickness of about 40 μm to which resistance control has not been given, for example, a copolymer of tetrafluoroethylene and ethylene, and a back layer (medium resistant layer, an earth layer) to which the resistance control by carbon has been given with the same material as this surface layer. A guide member 161 corresponding to the printing region by the recording head 134 is disposed on the back side of the feeding belt 151. A paper discharging section for discharging the paper 142 recorded at the recording head 134 comprises a separation nail 171 for separating the paper 142 from the feeding belt 151, a paper discharging roller 172 and a discharging half moon type roller 173. A paper discharge tray 103 is disposed beneath the paper discharging roller 172.

A both side paper supply unit 181 is detachably loaded on the backside section of the apparatus main body 101. The both side paper supply unit 181 takes in the paper sheet 142 returned in a reverse direction rotation of the feeding belt 151, reverses the paper 142 and supplies it again between the counter roller 152 and the feeding belt 151. A manual paper supply section 182 is provided on the upper surface of the both side paper supply unit 181.

In this inkjet recording apparatus, the paper sheets 142 are separated from one another and supplied one by one from the paper supply section, the paper sheet 142 supplied in the nearly vertical upward direction is guided by the guide 145, and fed by being sandwiched with the feeding belt 151 and the counter roller 152. The tip of the paper is further guided by the feeding guide 153, mounted on the feeding belt 151 at the tip pressurizing half moon-type roller 155, and changed in about 90° in its feeding direction.

At that time, the feeding belt 151 is charged by the electrical charged roller 156, and the paper sheet 142 is fed by being absorbed electrostatically. The ink drop is jetted onto the stopping paper sheet 142 to record one line by driving the recording head 134 depending on the image signals with moving the carriage 133 there, and next line is recorded after feeding the paper sheet 142 to a given amount. A recording operation is terminated by receiving a recording termination signal or a signal that a back end of the paper sheet 142 has reached the recording region, and the paper is discharged to the paper discharge tray 103.

When a remaining amount near end of the ink in the subtank 135 is detected, the ink in a given amount is supplied from the ink cartridge 201 to the subtank 135.

In this inkjet recording apparatus, when the ink in the ink cartridge 201 of the present invention is finished out, the housing case in the ink cartridge 201 can be decomposed and only the ink bag inside can be replaced by new one. Even when the ink cartridge is mounted lengthwise with its front surface exposed to the outside, stable ink supply can be achieved. Therefore, even when it disposed so as to occupy the space above the apparatus main body 101, for example, even when it is housed in a rack or an object has been placed over the apparatus main body 101, it is possible to easily change the ink cartridge 201.

Here, an example has been described in which the ink cartridge of the present invention is applied to a serial type (shuttle type) inkjet recording apparatus provided with a carriage moving across the apparatus, but it can be also applied to a line type inkjet recording apparatus comprising a line type head.

The inkjet recording apparatus and the inkjet recording method of the present invention can be applied to various recording modes by inkjet recording, and for example, can be suitably applied to printers for inkjet recording, facsimile machines, copying apparatuses, printer/facsimile/copier composite machines, and the like The inkjet head to which the present invention has been applied will be shown below.

Figure 6:
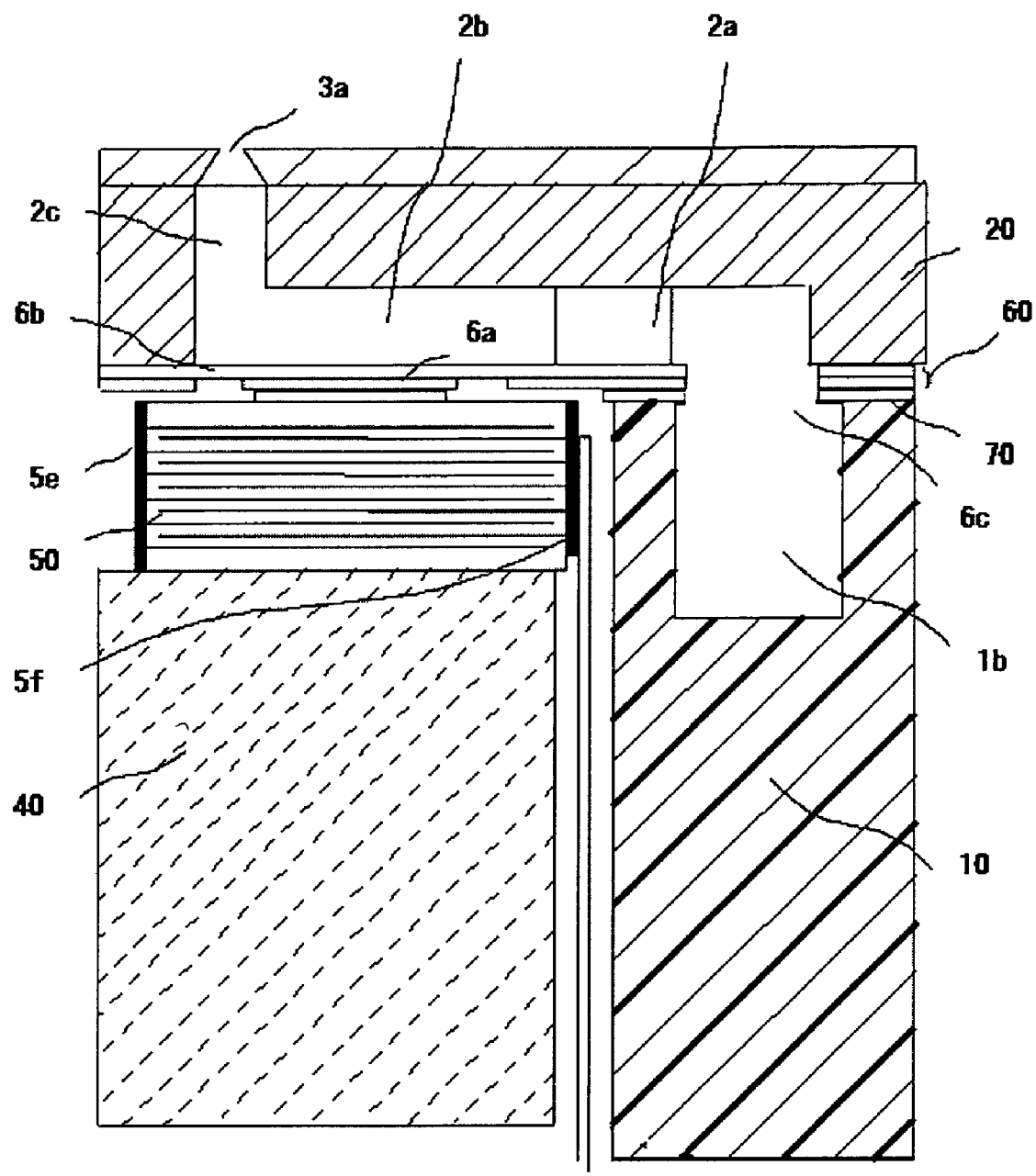
FIG. 6 is an element enlarged view showing one example of an inkjet head of the present invention.
Figure 7:
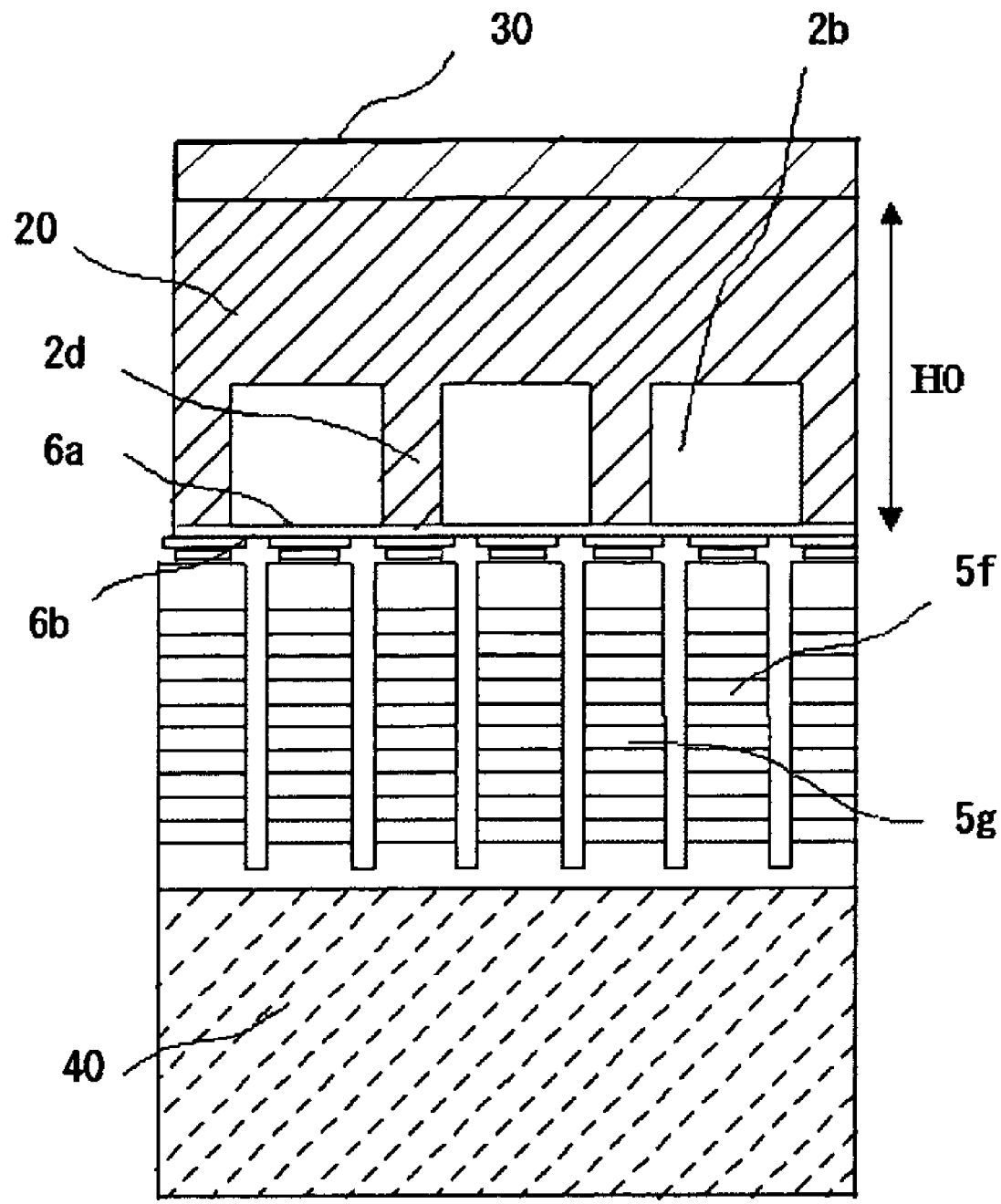
FIG. 7 is a substantial part enlarged sectional view showing one example of an inkjet head of the present invention.

FIG. 6 is an element enlarged view according to one embodiment of the inkjet head of the present invention, and FIG. 7 is a substantial part enlarged sectional view of the direction between channels of the same head.

This inkjet head comprises an engraved frame 10 which becomes a common liquid room 1b with an ink supply opening (not shown in the figure), a fluid resistance section 2a, a flow path plate 20 which forms a communication opening 2c which communicates with a nozzle 3a and an engraved section which becomes a pressurized liquid room 2b, a nozzle plate which forms the nozzle 3a, a convex section 6a, a vibration plate 60 having a diaphragm section 6b and an ink flow-in opening 6c, a laminated piezoelectric element 50 conjugated with the vibration plate 60 through an adhesion layer 70, and a base 40 securing the laminated piezoelectric element 50.

The base 40 is composed of barium titanate-based ceramic, and conjugates the laminated piezoelectric element 50 by arranging them in two lines.

The laminated piezoelectric element 50 is composed alternating piezoelectric layers made of titanic acid zirconic acid plumbum (PZT) with a thickness of 10 μm to 50 μm/per layer and internal electrode layers composed of silver/palladium (AgPd) with a thickness of several μm/per layer. Each of the internal electrode layer is connected at both ends to an external electrode.

The laminated piezoelectric element 50 is half cut to have a comb teeth shape by half cut-dicing processing, and the resultant teeth are alternately used as driving parts 5f and supporting parts 5g (non-driving part). The outside of the external electrodes is limited in length by processing such as notch to be divided by the half cut-dicing processing, and they become multiple individual electrodes. The other side of the external electrode is not cut by the dicing and is thoroughly brought in conduction to serve as a common electrode.

FPC8 is conjugated by solder to the individual electrode at the driving part. The common electrode is turned in by providing an electrode layer at an end of the laminated piezoelectric element to conjugate with Gnd electrode of FPC8. A driver IC not shown in the figure is mounted in FPC8, and this controls driving voltage application to the driving part 5f.

The vibration plate 60 comprises a diaphragm part 6b of thin film, an island convex part (island part) conjugated with the laminated piezoelectric element 50 which becomes the driving part 5f formed in a central part of this diaphragm 6b, a thick film part including a beam conjugated with the supporting part, and an opening which becomes an ink flow-in opening 6c by laminating two layers of Ni plated film by electrotyping method. The diaphragm part has a thickness of 3 μm and a width of 35 μm (one side).

The bond of island convex part 6a of this vibration plate 60 and a driving part 5f of the laminated piezoelectric element 50, and the bond of the vibration plate 60 and the frame 10 are adhered by patterning an adhesion layer 70 containing a gap material.

In the flow path plate 20, using a silicon monocrystal substrate, the fluid resistance section 2a and the pressurized liquid room 2b were engraved, and a penetrated opening which locates at a position for the nozzle 3a and became the communicated opening 2c was patterned by etching.

A remaining part after the etching becomes a partition wall 2d of the pressurized liquid room 2b. In this head, the part where an etching width was narrow was provided, and this was made the fluid resistance section 2a.

A nozzle plate 30 is formed from a metal material, for example formed by Ni plated film by electrotyping method, and forms many nozzles 3a which are fine jetting openings for flying ink drops. An internal shape of this nozzle 3*a* is formed into a horn shape (may be a sub-circular shape or sub-circular cone shape). The diameter of this nozzle 3*a* is about 20 μm to 35 μm at an ink outlet side. The nozzle pitch in each line was 150 dpi.

A water-repellent layer (not shown in the figure) to which water-repellent surface treatment has been given is provided on the jetting side (nozzle surface side) of this nozzle plate 30. A drop shape of the ink and a flying property is stabilized to obtain high quality images by providing a water-repellent film, e.g., PTEE-Ni eutectoid plating, electrodeposition painting of fluorine resin, vapor deposition coating of evaporable fluorine resin (e.g., pitch fluoride), and printing after applying the solvent of silicone resin and fluorine resin, selected depending on the physical property of the ink. Among them, for example, various materials as the fluorine resins are known, and the good water repellent finish can be obtained by vapor-depositing modified perfluoropolyoxetane (brand name: Optool, supplied from Daikin Industries, Ltd.)

The frame 10 on which the ink supply opening and the common liquid room 1*b* are engraved is produced by resin molding.

In the inkjet head constituted in this way, a displacement in a laminated direction is caused at the driving part 5*f* by applying a driving wave shape (pulse voltage of 10 V to 50 V) to the driving part 5*f* depending on a recording signal, the pressurized liquid room is pressurized through the vibration plate 60 to increase the pressure, and the ink drop is jetted from the nozzle 3*a*.

Along with terminating the jetting of the ink drop, the pressure of the ink in the pressurized liquid room 2*b* is reduced, and the negative pressure occurs in the pressurized liquid room 2*b* by inertia of ink flow and electric discharge process of driving pulse to transfer to an ink filling process. At that time, the ink supplied from the ink tank flows in the common liquid room 1*b*, passes from the common liquid room 1*b* to the fluid resistance section 2*a* through the ink flow-in opening 6*c*, and is fed in the pressurized liquid room 2*b*.

The fluid resistance section 2*a* has the effect on attenuation of residual pressure vibration after the jetting, but becomes resistant to refill by surface tension. The attenuation of the residual pressure and the refilling time can be balanced by optionally selecting the fluid resistance section, and the time (driving cycle) until transferring to a subsequent jetting behavior of the ink drop can be shortened.

In the inkjet recording apparatus used in the inkjet recording method of the present invention, a media polishing apparatus may be provided separately, but it is preferable to incorporate it in the media polishing apparatus.

Figure 8:
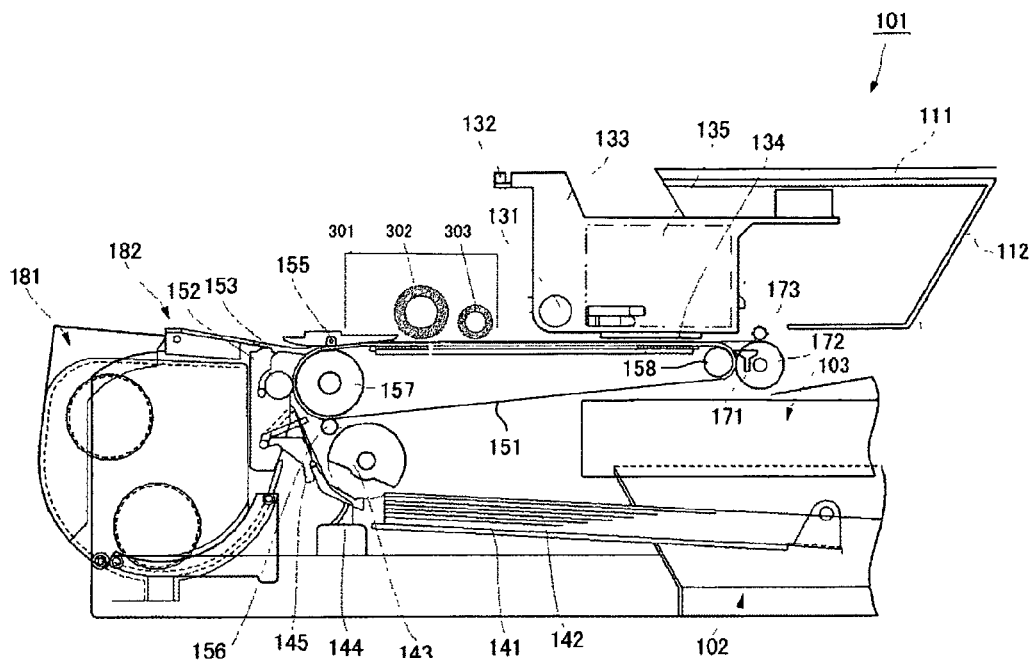
FIG. 8 is an illustrative view showing a media polishing apparatus built in the schematic configuration diagram illustrating an entire configuration of the inkjet recording apparatus.

In the inkjet recording apparatus shown in FIG. 8, by providing a polishing brush 302 and polishing the recording media on the way of feeding the recording media beneath the recording head 134, it is possible to exchange the popular print sheet to the recording media of the present invention. The constitution other than this point is the same as in FIG. 4. By using this inkjet recording apparatus, it is possible to make various sheets correspond to the inkjet recording method of the present invention.

<Ink Recorded Matter>

An ink recorded matter recorded by the inkjet recording method of the present invention is an ink recorded matter used in the present invention. The ink recorded matter has the image formed on the recording media of the present invention using the above ink.

The recorded matter has high image quality, no bleeding, is excellent in stability with time, and can be suitably used for various intended uses as documents on which various printings or images have been recorded.

Examples of the present invention will be described below, but the present invention is not limited to these Examples.

Production Example 1

Preparation of Copper Phthalocyanine Pigment-Containing Fine Particle Dispersion The air inside a 1 L flask equipped with a mechanical stirrer, a thermometer, a nitrogen gas inlet tube, a reflux tube and a dropping funnel was thoroughly substituted with nitrogen gas. Thereafter 11.2 g of styrene, 2.8 g of acrylic acid, 12.0 g of lauryl methacrylate, 4.0 g of polyethylene glycol methacrylate, 4.0 g of styrene macromer (brand name: AS-6 supplied from Toagosei Co., Ltd.) and 0.4 g of mercaptoethanol were placed in the flask, and the temperature was raised to 65° C. Subsequently, a mixed solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (brand name: AS-6 supplied from Toagosei Co., Ltd.), 3.6 g of mercaptoethanol, 2.4 g of azobismethyl valeronitrile and 18 g of methyl ethyl ketone was added dropwise to the flask over 2.5 hours.

After addition, a mixed solution of 0.8 g of azobismethyl valeronitrile and 18 g of methyl ethyl ketone was added dropwise to the flask over 0.5 hours. After maturing at 65° C. for 1 hour, 0.8 g of azobismethyl valeronitrile was added, and the mixture was matured for a further 1 hour. After the completion of the reaction, 364 g of methyl ethyl ketone was added into the flask to yield 800 g of a polymer solution at a concentration of 50% by mass. An aliquot of the resulting polymer solution was dried and subjected to gel permeation chromatography (standard: polystyrene, solvent: tetrahydrofuran); the weight average molecular weight (Mw) was 15,000.

Subsequently, 28 g of the resulting polymer solution, 26 g of the copper phthalocyanine pigment, 13.6 g of an aqueous solution of 1 ml/L potassium hydroxide, 20 g of methyl ethyl ketone and 30 g of ion-exchange water were thoroughly mixed. Then, the mixture was kneaded 20 times using a three roll mill (brand name: NR-84A supplied from Noritake Co., Limited). The resulting paste was added into 200 g of ion-exchange water, and after stirring thoroughly, methyl ethyl ketone and water were distilled off using an evaporator to yield 160 g of a blue polymer fine particle dispersion with a solid content of 20.0% by mass.

The resulting polymer fine particles were subjected to a particle size distribution measurement apparatus (Microtrack UPA supplied from Nikkiso Co., Ltd.); the average particle diameter (D50%) was 93 nm.

Production Example 2

Preparation of Dimethyl Quinacridone Pigment-Containing Polymer Fine Particle Dispersion A magenta polymer fine particle dispersion was prepared in the same way as in Production Example 1, except that the copper phthalocyanine pigment was changed to a pigment, Pigment Red 122.

The average particle diameter (D50%) of the he resulting polymer fine particles measured using a particle size distribution analyzer (Microtrack UPA supplied from Nikkiso Co., Ltd.) was 127 nm.

Production Example 3

Preparation of Monoazo Yellow Pigment-Containing Polymer Fine Particle Dispersion A yellow polymer fine particle dispersion was prepared in the same way as in Production Example 1, except that the copper phthalocyanine pigment was changed to a pigment, Pigment Yellow 74.

The average particle diameter (D50%) of the resulting polymer fine particles measured using a particle size distribution analyzer (Microtrack UPA supplied from Nikkiso Co., Ltd.) was 76 nm.

Production Example 4

Preparation of Carbon Black Dispersion Solution

To 1,000 ml of was added 300 g of commercially available acidic carbon black with pH 2.5 (brand name: Monarch 1300 supplied from Cabot Corporation) and was thoroughly mixed. Then, 450 g of sodium hypochlorite (effective chlorine concentration: 12%) was added dropwise, and the mixture was stirred at 100° C. to 105° C. for 8 hours. To this solution, 100 g of sodium hypochlorite (effective chlorine concentration: 12%) was further added, and dispersed for 3 hours using a transverse dispersing machine. A resulting slurry was diluted 10 times with water, pH was adjusted with lithium hydroxide, and the slurry was salted out and concentrated up to an electric conductivity of 0.2 mS/cm by ultrafiltration to yield a carbon black dispersion solution with a pigment concentration of 15% by mass. Coarse and large particles were removed by centrifugation and the solution was further filtrated through a nylon filter of 1 μm to yield a carbon black dispersion solution.

The average particle diameter (D50%) of the resulting polymer fine particles measured using the particle size distribution analyzer (Microtrack UPA supplied from Nikkiso Co., Ltd.) was 95 nm.

Production Example 5

Preparation of Carbon Black Polymer Fine Particle Dispersion

A black polymer fine particle dispersion was prepared in the same way as in Production Example 1, except that the copper phthalocyanine pigment was changed to carbon black (FW10 supplied from Degussa).

The average particle diameter (D50%) of the resulting polymer fine particles measured using the particle size distribution analyzer (Microtrack UPA supplied from Nikkiso Co., Ltd.) was 104 nm.

Production Example 6

Preparation of Carbon Black Dispersion Treated with Diazo Compound

Carbon black (100 g) having a specific surface area of 230 m$^2$/g and a DBP oil absorption of 70 mL/100 g and 34 g of p-amino-N-benzoic acid were mixed and dispersed in 750 g of water, and 16 g of nitric acid was added thereto, followed by stirring at 70° C. After 5 minutes, a solution in which 11 g of sodium nitrite had been dissolved in 50 g of water was added thereto and was stirred for a further 1 hour. The resulting slurry was diluted 10 times, course and large particles were removed by centrifugation, and the pH was adjusted with diethanolamine to 8 to 9. The solution was salted out and concentrated by ultrafiltration to yield the carbon black dispersion with a pigment concentration of 15% by mass, which was then filtrated through a polypropylene of 0.5 μm to yield a carbon black dispersion.

The average particle diameter (D50%) of the resulting carbon black dispersion measured using the particle size distribution analyzer (Microtrack UPA supplied from Nikkiso Co., Ltd.) was 99 nm.

Production Example 7

Preparation of Carbon Black Dispersion Treated with Sulfonating Agent 150 g of commercially available carbon black (Printex #85 supplied from Degussa) was thoroughly mixed in 400 mL of sulfolane, and after finely dispersed using a beads mill, 15 g of amide sulfuric acid was added thereto, followed by stirring at 140° C. to 150° C. for 10 hours. The resulting slurry was added into 1,000 mL of ion-exchange water, which was then centrifuged at 12,000 rpm to yield a surface-treated carbon black wet cake. This carbon black wet cake was redispersed in 2,000 mL of ion-exchange water, and pH was adjusted with lithium hydroxide. The dispersion was salted out and concentrated by ultrafiltration to yield a carbon black dispersion with a pigment concentration of 10% by mass. This was then filtrated through a nylon filter of 1 μm to yield a carbon black body. The average particle diameter (D50%) of the resulting carbon black body measured using the particle size distribution analyzer (Microtrack UPA supplied from Nikkiso Co., Ltd.) was 80 nm.

Subsequently, ink compositions were produced using the polymer fine particle dispersions and the carbon black dispersions obtained in the above Production Examples.

Production Example 8

Preparation of Cyan Ink Composition 1

20% by mass of the copper phthalocyanine pigment-containing polymer fine particle dispersion in Production Example 1, 23.0% by mass of 3-methyl-1,3-butanediol, 8.0% by mass of glycerine, 2.0% by mass of 2-ethyl-1,3-hexanediol, 2.5% by mass of FS-300 (supplied from DuPont), 0.2% by mass of Proxel LV (supplied from Avecia), and 0.5% by mass of 2-amino-2-ethyl-1,3-propanediol were mixed, and an appropriate amount of ion-exchange water was added to make the total amount 100%. Subsequently, the mixture was filtrated through a membrane filter with an average pore diameter of 0.8 μm. By the above, a composition was prepared. In the resulting composition at 25° C., the viscosity was 9 mPa·s and the surface tension was 25 mN/m. The viscosity was measured at 25° C. using a viscosity analyzer (R500 rotation viscometer supplied from Toki Sangyo Co., Ltd.).

Production Example 9

Preparation of Magenta Ink Composition 1

20% by mass of the dimethyl quinacridone pigment-containing polymer fine particle dispersion in Production Example 2, 22.5% by mass of 3-methyl-1,3-butanediol, 9.0% by mass of glycerine, 2.0% by mass of 2-ethyl-1,3-hexanediol, 2.5% by mass of FS-300 (supplied from DuPont), 0.2% by mass of Proxel LV (supplied from Avecia), and 0.5% by mass of 2-amino-2-ethyl-1,3-propanediol were mixed, and an appropriate amount of ion-exchange water was added to make the total amount 100%. Subsequently, the mixture was filtrated through a membrane filter with an average pore diameter of 0.8 μm. By the above, a composition was prepared. In the resulting composition at 25° C., the viscosity was 9 mPa·s and the surface tension was 25 mN/m.

Production Example 10

Preparation of Yellow Ink Composition 1

20.0% by mass of the monoazo yellow pigment-containing polymer fine particle dispersion in Production Example 3, 24.5% by mass of 3-methyl-1,3-butanediol, 8.0% by mass of glycerine, 2.0% by mass of 2-ethyl-1,3-hexanediol, 2.5% by mass of FS-300 (supplied from DuPont), 0.2% by mass of Proxel LV (supplied from Avecia), and 0.5% by mass of 2-amino-2-ethyl-1,3-propanediol were mixed, and an appropriate amount of ion-exchange water was added to make the total amount 100%. Subsequently, the mixture was filtrated through a membrane filter with an average pore diameter of 0.8 μm. By the above, a composition was prepared. In the resulting composition at 25° C., the viscosity was 9 mPa·s and the surface tension was 25 mN/m.

Production Example 11

Preparation of Black Ink Composition 20.0% by mass of the carbon black dispersion in Production Example 7, 22.5% by mass of 3-methyl-1,3-butanediol, 7.5% by mass of glycerine, 2.0% by mass of 2-pyrrolidone, 2.0% by mass of 2-ethyl-1,3-hexanediol, 2.0% by mass of R—(OCH$_2$CH$_2$)$_n$OH (wherein, R is an alkyl group having 12 carbon atoms and n=9), 0.2% by mass of Proxel LV (supplied from Avecia), and 0.5% by mass of 2-amino-2-ethyl-1,3-propanediol were mixed, and an appropriate amount of ion-exchange water was added to make the total amount 100%. Subsequently, the mixture was filtrated through a membrane filter with an average pore diameter of 0.8 μm. By the above, a composition was prepared. In the resulting composition at 25° C., the viscosity was 9 mPa·s and the surface tension was 25 mN/m.

Production Example 12

Preparation of Dye Ink

The ingredients shown below were mixed, thoroughly stirred and dissolved, and then filtrated by pressure through Floropore Filter of 0.45 μm in pore size (brand name, supplied from Sumitomo Electric Industries, Ltd.) to prepare dye ink sets.

| Ingredients of dye ink | |
|---|---|
| Dye type | |
| Yellow: | C.I. Direct Yellow 86 |
| Cyan: | C.I. Direct Blue 199 |
| Magenta: | C.I. Acid Red 285 |
| Black: | C.I. Direct Black 154 |
| Formulation | |
| Dye | 4 parts by mass |
| Glycerine | 7 parts by mass |
| Thioglycol | 7 parts by mass |
| Urea | 7 parts by mass |
| Acetylene glycol | 1.5 parts by mass |
| Water | 73.5 parts by mass |

In the resulting ink composition at 25° C., the viscosity was 4 mPa·s and the surface tension was 25 dyne/cm.

Production Example 13

| -Production of substrate 1- | |
|---|---|
| LBKP | 80 parts by mass |
| NBKP | 20 parts by mass |
| Light calcium carbonate (brand name: TP-121 supplied from Okutama Kogyo Co., Ltd.) | 10 parts by mass |
| Aluminium sulfate | 1.0 parts by mass |
| Amphoteric starch (brand name: Cato 3210 supplied from Nippon NSC Ltd.) | 1.0 parts by mass |
| Neutral rosin sizing agent (brand name: NeuSize M-10 supplied from Harima Chemicals Inc.) | 0.3 parts by mass |
| Process yield improver (brand name: NR-11LS supplied from Hymo Co., Ltd.) | 0.02 parts by mass |

A substrate 1 weighed 79 g/m$^2$ was made by papermaking the slurry of 0.3% by mass of the above combination using a fourdrinier papermaking machine and finishing with machine calendar. In a size press step of the papermaking process, an aqueous solution of oxidized starch was applied so that an deposited amount of the solid content was 1.0 g/m$^2$ per one side.

Example 1

As a pigment 70 parts by mass of kaolin (refraction index: 1.6, Ultrawhite 90 supplied from Engelhard) in which the proportion of particles with a particle diameter of 2 μm or less was 97% by mass and 30 parts by mass of heavy calcium carbonate (refraction index: 1.6, CALSHITEC Brilliant supplied from Shiroishi Kougyou Co., Ltd.) having the average particle diameter of 1.1 μm; as an adhesive 8 parts by mass of styrene-butadiene copolymer emulsion having a glass transition temperature (Tg) of −5° C. and 1 part by mass of phosphate esterified starch; as an aid 0.5 parts by mass of calcium stearate; and water were mixed to prepare a coating solution with a solid content concentration of 60% by mass.

This coating solution was applied on both side of the substrate 1 using a blade coater so that the thickness of a coating layer was 1 μm per one side, dried with hot wind, and a super calendar treatment was given thereto to form a "recording sheet 1" of the present invention.

The pore size and the proportion of pores at a surface of barrier layer in these recording sheets were measured using an electron microscope. Barrier layers satisfying the condition that the pore size is 1 μm or less in diameter and the proportion of pores at its surface is 40% or less is considered A, and those not satisfying this condition is considered B. The obtained results are shown in Table 1.

Subsequently, an ink set 1 with black, yellow, magenta and cyan colors composed of the compositions produced in Production Examples 1 to 11 was prepared, and the printing with an image resolution of 600 dpi was performed using the obtained ink set 1 and the recording sheet 1 as the recording media and using a drop on demand printer test model having 300 dpi and a nozzle resolution of 384 nozzles. The maximum drop size was 18 pl, and adhesion amount regulation was performed by making total amount regulation 140%. The solid image and letters were printed so that the total amount of the ink in 300 dot square did not exceed 15 g/m$^2$ upon solid printing. For the obtained images, the image quality level and the image reliability were evaluated as follows. Results are shown in Table 1. Ones evaluated as "D" in the evaluation are not suitable as the inkjet image.

<Evaluation Items and Evaluation Methods>
(1) Image Quality Level
<Show Through>

The image density on a backside of a green solid image portion from Examples and Comparative Examples was measured, and the show through density was obtained by subtracting a background density from this. The evaluation was performed using this density in addition to visual inspection based on the following criteria.

(Evaluation Criteria)
(A): The show through density of 0.1 or less and uniform printing with no fine show through;
(B): the show through density of 0.15 or less and uniform printing with no fine show through;
(C): the show through density is 0.15 or less but little show through is observed; and
(D): remarkable show through occurs.
<Beading>

An extent of the beading on the green solid image portion from Examples and Comparative Examples was visually observed, and ranked/evaluated based on the following criteria.

(Evaluation Criteria)
5: uniform printing with no beading;
4: slight beading occurs, but its level is negligible;
3: beading occurs, but its level does not impair the image quality level;
2: beading evidently occurs; and
1: beading remarkably occurs.
(Evaluation of Density)

The optical density on the magenta solid image portion from Examples and Comparative Examples was measured using X-Rite 932, and evaluated based on the following criteria.

(Evaluation Criteria)
(A): The magenta image density is 1.6 or more;
(B): the magenta image density is 1.3 or more;
(C): the magenta image density is 1.0 or more; and
(D): the magenta image density is less than 1.0.
<Evaluation of Glossiness>

The glossiness of the image portion from Examples and Comparative Examples was visually observed, and evaluated based on the following criteria.
<Evaluation Criteria>
(A): high glossiness;
(B): moderate glossiness; and
(C): no glossiness.
(2) Image Reliability
<Evaluation of Image Reliability>

As the images to be evaluated, black, cyan, magenta, yellow, red, green and blue squares (3 cm×3 cm) were made. Twenty four hours after the printing, using a clock meter (CM-1 type), a white cotton cloth (JIS L0803 Cotton No. 3) was attached on a friction matter using an adhesive double coated tape (#4016 t=1.6 supplied from 3M), with which the image was rubbed by going and returning 5 times, and then the density of the color material attached to the cotton cloth was measured using a spectro-colorimetry densitometer (Model-938 supplied from X-Rite).

Example 2

The inkjet recording was performed in the same way as in Example 1, except that the "recording sheet 2" was obtained by making the thickness of the coating layer 10 μm per one side, and likewise evaluated. The results are shown in Table 1.

Example 3

The inkjet recording was performed in the same way as in Example 2, except that the "recording sheet 3" was obtained by changing the inorganic pigment in the coating solution in Example 1 to 100 parts by mass (solid content) of TA-100 (anatase type titanium oxide, refraction index: 2.5 supplied from Fuji Titanium Industry Co., Ltd.), and likewise evaluated. The results are shown in Table 1.

Example 4

The inkjet recording was performed in the same way as in Example 1, except that the "recording sheet 4" was obtained by changing the inorganic pigment in the coating solution in Example 1 to 100 parts by mass of TP-221 (light calcium carbonate, refraction index: 1.6 (1.59) supplied from Okutama Kogyo Co., Ltd.) and making the thickness of the coating layer 5 μm, and likewise evaluated. The results are shown in Table 1.

Example 5

The inkjet recording was performed in the same way as in Example 1, except that Space DX (containing kaolin, refraction index: 1.6/calcium carbonate, refraction index: 1.6, supplied from Nippon Paper Industries Co., Ltd.) ("recording sheet 5") which was the coated paper for the gravure printing was used for the recording media in Example 1, and likewise evaluated. The results are shown in Table 1.

Example 6

The inkjet recording was performed in the same way as in Example 1, except that POD Gloss (containing kaolin, refraction index: 1.6/calcium carbonate, refraction index: 1.6, supplied from Oji Paper Co., Ltd.) ("recording sheet 6") which was the coated paper for the electrograph was used for the recording media in Example 5, and likewise evaluated. The results are shown in Table 1.

Example 7

The inkjet recording was performed in the same way as in Example 5, except that one ("recording sheet 7") obtained by polishing the surface of POD Gloss (containing kaolin, refraction index: 1.6/calcium carbonate, refraction index: 1.6, supplied from Oji Paper Co., Ltd.) which was the coated paper for the electrograph with wrapping paper 20 times to make the thickness of the coating layer 5.1 μm was used as the recording media, and likewise evaluated. The results are shown in Table 1.

Example 8

The inkjet recording was performed in the same way as in Example 5, except that one ("recording sheet 8") obtained by polishing the surface of OK Trinity (containing kaolin, refraction index: 1.6/calcium carbonate, refraction index: 1.6, supplied from Oji Paper Co., Ltd.) which was the coated paper for the offset printing with the wrapping paper 10 times to make the thickness of the coating layer 6.2 μm was used as the recording media, and likewise evaluated. The results are shown in Table 1.

Example 9

The inkjet recording was performed in the same way as in Example 5, except that one ("recording sheet 9") obtained by polishing the surface of OK Trinity (containing kaolin, refraction index: 1.6/calcium carbonate, refraction index: 1.6, supplied from Oji Paper Co., Ltd.) which was the coated paper for the offset printing with the wrapping paper 20 times to make the thickness of the coating layer 2.1 μm was used as the recording media, and likewise evaluated. The results are shown in Table 1.

Example 10

The inkjet recording was performed in the same way as in Example 5, except that OK Non-wrinkle DL (containing kaolin, refraction index: 1.6/calcium carbonate, refraction index: 1.6, supplied from Oji Paper Co., Ltd.) ("recording sheet 10") which was the coated paper for the offset printing was used as the recording media in Example 5, and likewise evaluated. The results are shown in Table 1.

Example 11

The inkjet recording was performed in the same way as in Example 5, except that one ("recording sheet 11") obtained by polishing the surface of OK Non-wrinkle DL (containing kaolin, refraction index: 1.6/calcium carbonate, refraction index: 1.6, supplied from Oji Paper Co., Ltd.) which was the coated paper for the offset printing with the wrapping paper 5 times to make the thickness of the coating layer 2.9 μm was used as the recording media, and likewise evaluated. The results are shown in Table 1.

Example 12

The inkjet recording was performed in the same way as in Example 5, except that one ("recording sheet 12") obtained by polishing the surface of OK Non-wrinkle DL (containing kaolin, refraction index: 1.6/calcium carbonate, refraction index: 1.6, supplied from Oji Paper Co., Ltd.) which was the coated paper for the offset printing with the wrapping paper 20 times to make the thickness of the coating layer 1.4 μm was used as the recording media, and likewise evaluated. The results are shown in Table 1.

Comparative Example 1

The inkjet recording was performed in the same way as in Example 6, except that the ink set in Example 6 was changed to the dye-based ink set in Production Example 12, and likewise evaluated. The results are shown in Table 1.

Comparative Example 2

The inkjet recording was performed in the same way as in Example 5, except that OK Trinity (containing kaolin, refraction index: 1.6/calcium carbonate, refraction index: 1.6, supplied from Oji Paper Co., Ltd.) ("recording sheet for comparison 2") which was the coated paper for the offset printing was used as the recording media, and likewise evaluated. The results are shown in Table 1.

Comparative Example 3

The inkjet recording sheet ("recording sheet for comparison 3") was made in the same way as in Example 1, except that the inorganic pigment in the coating solution in Example 2 was changed to 100 parts by mass of Spherica Slurry-300 (silica, average particle diameter: 0.28 μm, refraction index: 1.45-1.48, supplied from Catalyst & Chemicals Co., Ltd.), and the inkjet recording was performed, and likewise evaluated. The results are shown in Table 1.

Comparative Example 4

The inkjet recording sheet ("recording sheet for comparison 4") was made in the same way as in Example 1, except that the inorganic pigment in the coating solution in Example 2 was changed to 100 parts by solid mass of AS-2 (alumina Sol, average particle diameter: 0.1 μm, refraction index: 1.7 (1.65), supplied from Catalyst & Chemicals Co., Ltd.), and the inkjet recording was performed, and likewise evaluated. The results are shown in Table 1.

TABLE 1

| | Ink | | Media | | | | Image quality level | | | | Image reliability |
|---|---|---|---|---|---|---|---|---|---|---|---|
| | Color material | Barrier layer pigment | Method of producing barrier layer | Film** thickness (μm) | Pore size and pore proportion | Show through | Beading | Density | Gloss | | Anti-abrasion |
| Example 1 | Pigment | Kaolin/Cal. Carb. | Coating | 1 | A | B | 4.5 (A) | B | B | | B |
| Example 2 | Pigment | Kaolin/Cal. Carb. | Coating | 10 | A | B | 3 (B) | B | B | | B |
| Example 3 | Pigment | Titanium oxide | Coating | 1 | A | A | 4.5 (A) | B | B | | B |

TABLE 1-continued

| | Ink | | Media | | | Image quality level | | | | Image reliability |
|---|---|---|---|---|---|---|---|---|---|---|
| | Color material | Barrier layer pigment | Method of producing barrier layer | Film** thickness (μm) | Pore size and pore proportion | Show through | Beading | Density | Gloss | Anti-abrasion |
| Example 4 | Pigment | Cal. Carb | Coating | 5 | A | B | 4 (A) | B | B | B |
| Example 5 | Pigment | Kaolin/Cal. Carb | Space DX | 5 | A | A | 3.5 (B) | B | B | B |
| Example 6 | Pigment | Kaolin/Cal. Carb | POD gloss coat | 9 | A | A | 2 (C) | B | B | B |
| Example 7 | Pigment | Kaolin/Cal. Carb | POD gloss coat Polishing 20 times | 5.1 | A | A | 3 (B) | B | B | B |
| Example 8 | Pigment | Kaolin/Cal. Carb | Trinity, Polishing 10 times | 6.2 | A | A | 2.5 (C) | B | B | B |
| Example 9 | Pigment | Kaolin/Cal. Carb | Trinity, Polishing 20 times | 2.1 | A | A | 4 (A) | B | B | B |
| Example 10 | Pigment | Kaolin/Cal. Carb | OK Non-wrinkle DL | 6 | A | A | 2.5 (C) | B | B | B |
| Example 11 | Pigment | Kaolin/Cal. Carb | OK Non-wrinkle DL Polishing 5 times | 2.9 | A | A | 4 (A) | B | B | B |
| Example 12 | Pigment | Kaolin/Cal. Carb | OK Non-wrinkle DL Polishing 20 times | 1.4 | A | A | 4.5 (A) | B | B | B |
| Comparative Example 1 | Dye | Kaolin/Cal. Carb | Coating | 16 | A | A | 1 (D) | B | B | B |
| Comparative Example 2 | Pigment | Kaolin/Cal. Carb | Trinity | 11 | A | A | 1 (D) | B | B | B |
| Comparative Example 3 | Pigment | Silica | Coating | 10 | B | DD | 2 (C) | C | D | B |
| Comparative Example 4 | Pigment | alumina | Coating | 10 | B | B | 2 (C) | C | D | B |

(Note: "Cal. Carb" represents calcium carbonate)

Figure 9:
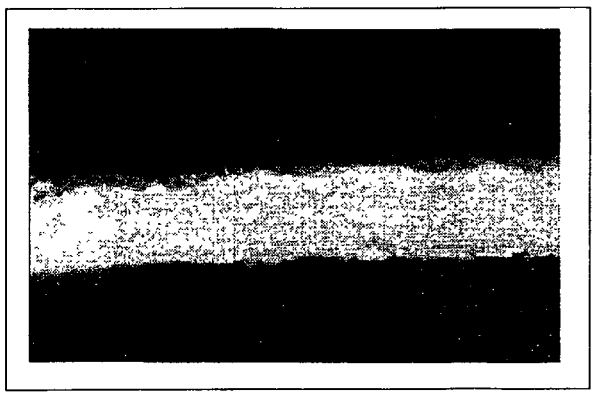
FIG. 9 is a view showing a sectional photograph of an image forming section in Example 6.
Figure 10:
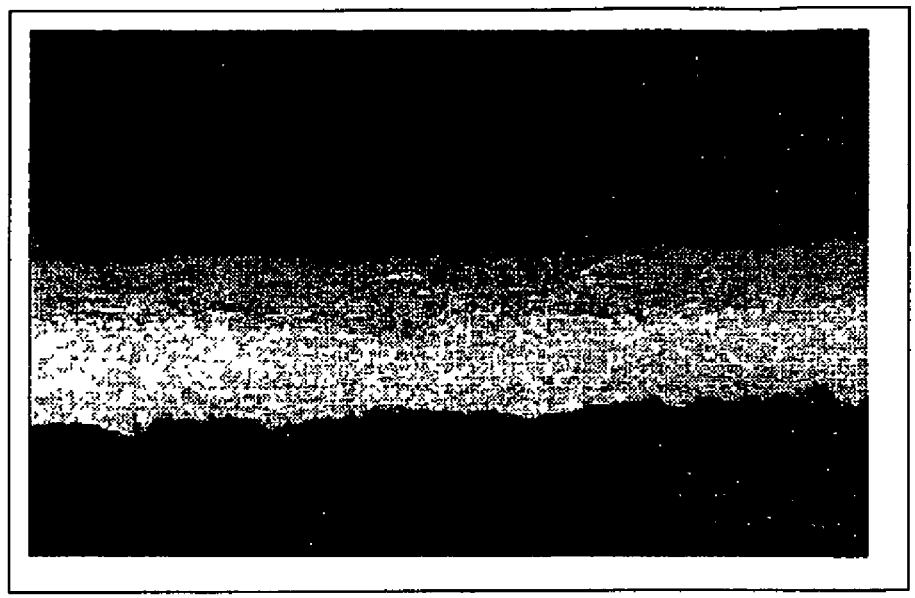
FIG. 10 is a view showing a sectional photograph of an image forming section in Comparative Example 1.

FIG. 9 is a sectional photograph a red solid image printed using the ink media set of the present invention, and FIG. 10 is a sectional photograph in the case of the combination of the dye ink and the media of the present invention. As mentioned above, it has been found that the coating layer serves as the color material barrier layer.

Figure 11:
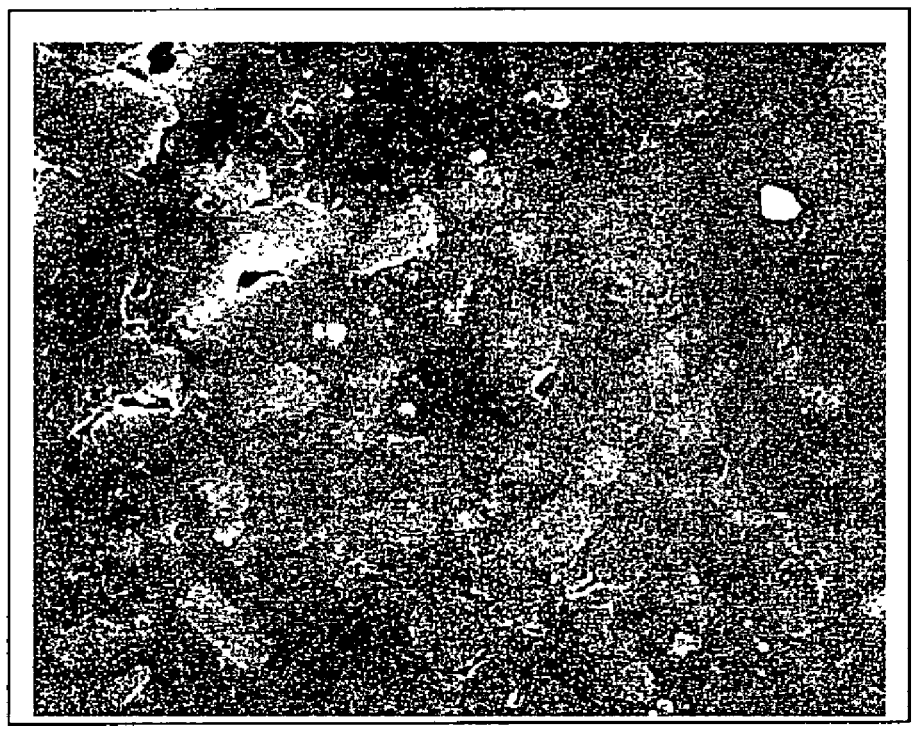
FIG. 11 is an SEM photograph of a surface in Comparative Example 2.
Figure 12:
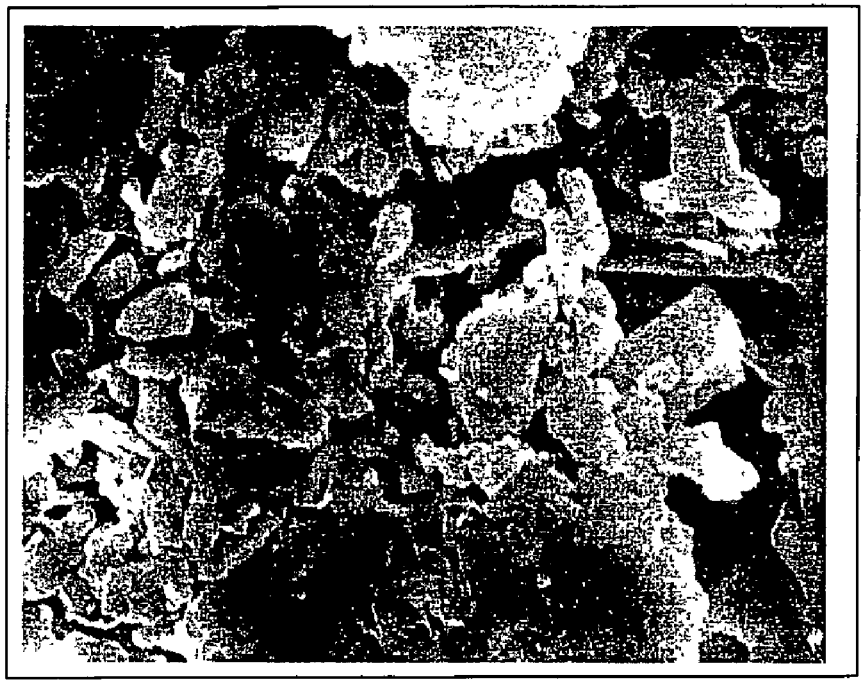
FIG. 12 is an SEM photograph of a surface in Example 8.

FIG. 11 shows the surface of the coated paper (Comparative Example 2) for the offset printing, and FIG. 12 shows the surface of one (Example 8) where the coating layer was exchanged to the barrier layer by the method of the present invention.

It is evident that the number of pores in the surface has been increased.

Figure 13:
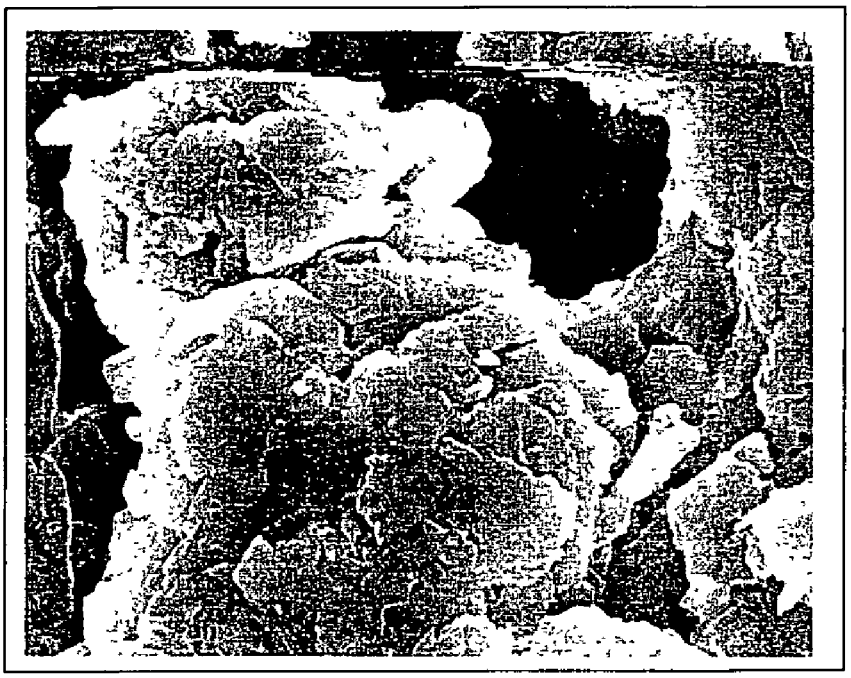
FIG. 13 is an SEM photograph of a surface in Example 7.

FIG. 13 shows the surface of the coated paper (Example 7) for the electrograph, capable of being used as the media of the present invention.

Figure 14:
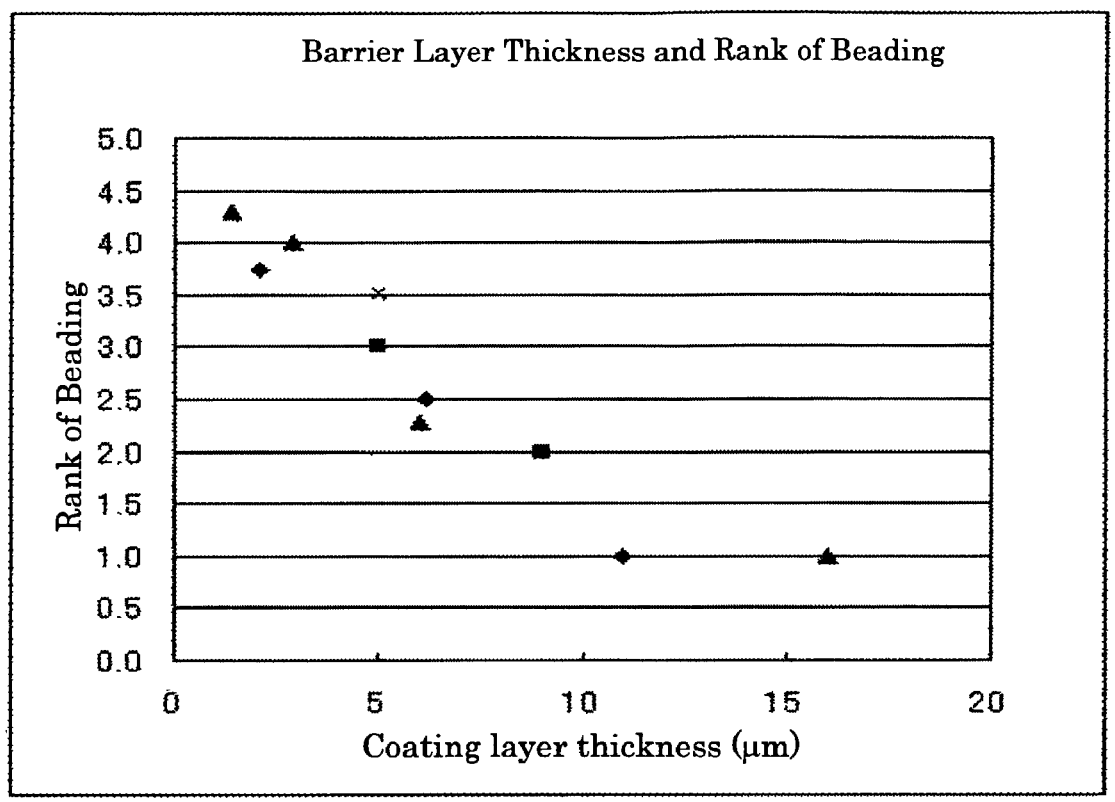
FIG. 14 is a view showing a relationship between the thickness of a barrier layer in the present invention and an image quality for Examples 5 to 12 and Comparative Example 2.

FIG. 14 shows the relationship between the thickness of the barrier layer described in the present invention and the image quality for Examples 5 to 12 and Comparative Example 2, where image quality is improved and at a thickness of 10 μm or less.

INDUSTRIAL APPLICABILITY

The recording media and the recording media-ink set of the present invention can provide (i) a recorded image which is so-called "sharp", has a printing quality level where no blur, feathering and bleeding occurred around the letter and the image, and is excellent in glossiness, (ii) a recorded image having the high optical density and (iii) a highly uniform image where no beading is observed in the solid portion, using the recording media having the texture close to that of the sheets for the popular commercial printing, and can be suitably used for the ink recorded matter, the inkjet recording apparatus and the inkjet recording method.

The inkjet recording apparatus and the inkjet recording method of the present invention can be applied to various recording modes by inkjet recording, and can be particularly suitably applied to, for example, based on this density and visual determination printers for inkjet recording, facsimile apparatuses, copying apparatuses, printer/facsimile/copia composite machines, printing machines and the like.

The invention claimed is:

1. An inkjet recording method comprising:
applying a stimulation to an ink to form an image by spraying the ink onto a recording media, wherein the stimulation is at least one selected from the group consisting of heat, pressure, vibration and light,
wherein the recording media has at least one barrier layer having a thickness of 10 μm or less on at least one surface of a substrate comprising a cellulose pulp, the barrier layer contains 30% by mass or more of an inorganic pigment with a refraction index of 1.5 or more other than alumina, and the content of a pigment with a refraction index of less than 1.5 in the barrier layer is 10% by mass or less,
wherein the ink contains either a pigment or colored fine particles as a coloring material and a coloring material fixing constituent, and the surface tension of the ink is 25 mN/m or less, and
wherein the total amount of the ink on the recording media is 15 g/m$^2$ or less.

2. The inkjet recording method according to claim 1, wherein pores at a surface of the barrier layer in the recording media are 1 μm or less in diameter, and 40% or less of the surface of the barrier layer surface is occupied by the pores.

3. The inkjet recording method according to claim 1, wherein the recording media has the barrier layer whose surface has been polished.

4. The inkjet recording method according to claim 3, further comprising polishing, before recording, a surface of coated paper to produce the recording media having the barrier layer whose surface has been polished.

5. The inkjet recording method according to claim 1, wherein the volume average particle diameter of either the pigment or the colored fine particles, as the coloring material, is 0.01 μm to 0.16 μm.

6. The inkjet recording method according claim 1, wherein the viscosity of the ink at 25° C. is 5 cps or more.

7. The inkjet recording method according to claim 1, wherein the ink comprises a water-soluble organic solvent, and the water-soluble organic solvent is either a polyol compound having 8 or more carbon atoms or a glycol ether compound.

8. The inkjet recording method according to claim 7, wherein the polyol compound having 8 or more carbon atoms is at least one of 2-ethyl-1,3-hexanediol and 2,2,4-trimethyl-1,3-pentanediol.

9. The inkjet recording method according to claim 1, wherein the ink contains a surfactant, and the surfactant is at least one selected from the group consisting of (I), (II), (III), (IV), (V) and (VI):

$$R^1\text{—}O\text{—}(CH_2CH_2O)_hCH_2COOM \quad \text{General Formula (I)}$$

where $R^1$ represents an alkyl group, h represents an integer of 3 to 12, and M represents any one selected from alkali metal ion, quaternary ammonium, quaternary phosphonium and alkanolamine;

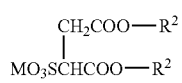

General Formula (II)

where $R^2$ represents an alkyl group; and M represents any one selected from alkali metal ion, quaternary ammonium, quaternary phosphonium and alkanolamine;

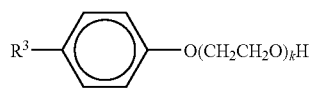

General Formula (III)

where $R^3$ represents a hydrocarbon group and k represents an integer of 5 to 20;

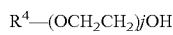
$$R^4\text{—}(OCH_2CH_2)_jOH \quad \text{General Formula (IV)}$$

where $R^4$ represents a hydrocarbon group and j represents an integer of 5 to 20;

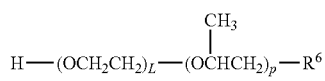

General Formula (V)

where $R^6$ represents a hydrocarbon group, and L and p represent integers of 1 to 20, respectively; and

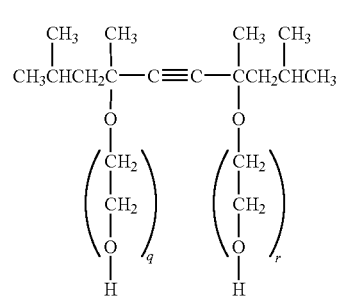

General Formula (VI)

where q and r each represents an integer of 0 to 40.

10. The inkjet recording method according to claim 1, wherein the ink contains a wetting agent, and the wetting agent is at least one selected from the group consisting of a polyol compound, a lactam compound, a urea compound and a saccharide.

11. The inkjet recording method according to claim 10, wherein the polyol compound is at least one selected from the group consisting of glycerine, ethylene glycol, diethylene glycol, triethylene glycol, tetraethylene glycol, polyethylene glycol, propylene glycol, dipropylene glycol, tripropylene glycol, 1,3-butanediol, 2,3-butanediol, 1,4-butanediol, 3-methyl-1,3-butanediol, 1,3-propanediol, 1,5-pentanediol, 1,6-hexanediol, 2-methyl-2,4-pentanediol, 1,2,4-butanetriol, 1,2,6-hexanetriol, thiodiglycol, pentaerythritol, trimethylolethane and trimethylolpropane.

12. The inkjet recording method according to claim 10, wherein the lactam compound is at least one selected from the group consisting of 2-pyrrolidone, N-methyl-2-pyrrolidone, N-hydroxyethyl-2-pyrrolidone and ε-caprolactam.

13. The inkjet recording method according to claim 10, wherein the urea compound is at least one selected from the group consisting of urea, thiourea, ethylene urea and 1,3-dimethyl-2-imidazolidinone.

14. The inkjet recording method according to claim 10, wherein the saccharide is at least one selected from the group consisting of maltitose, sorbitose, gluconolactone and maltose.

15. The inkjet recording method according to claim 10, wherein the content of the wetting agent in the ink is 10% by mass to 50% by mass.

16. The inkjet recording method according to claim 10, wherein the ink is at least one selected from the group consisting of a cyan ink, a magenta ink, a yellow ink and a black ink.

17. An inkjet recording apparatus comprising:
ink spraying means for spraying ink by application of stimulation to the ink to form an image on a recording media, wherein the stimulation is at least one selected from the group consisting of heat, pressure, vibration and light,
wherein the recording media has at least one barrier layer having a thickness of 10 μm or less on at least one surface of a substrate comprising a cellulose pulp, the barrier layer contains 30% by mass or more of an inorganic pigment with a refraction index of 1.5 or more other than alumina, and the content of a pigment with a refraction index of less than 1.5 in the barrier layer is 10% by mass or less,
wherein the ink contains either a pigment or colored fine particles as a coloring material, and a coloring material fixing constituent, and the surface tension of the ink is 25 mN/m or less, and wherein the total amount of the ink on the recording media is 15 g/m² or less.

18. The inkjet recording apparatus according to claim 17, further comprising polishing means for polishing a surface of coated paper to produce a recording media in which the pore diameter at a surface of a barrier layer is 1 μm or less and 40% or less of the surface of the barrier layer surface is occupied by pores.

* * * * *